(12) United States Patent
Ando

(10) Patent No.: US 11,260,458 B2
(45) Date of Patent: Mar. 1, 2022

(54) CUTTING INSERT, CUTTING TOOL AND METHOD FOR MANUFACTURING MACHINED PRODUCT

(71) Applicant: KYOCERA CORPORATION, Kyoto (JP)

(72) Inventor: Yuichi Ando, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 101 days.

(21) Appl. No.: 16/629,581

(22) PCT Filed: Jul. 11, 2018

(86) PCT No.: PCT/JP2018/026220
§ 371 (c)(1),
(2) Date: Jan. 9, 2020

(87) PCT Pub. No.: WO2019/013263
PCT Pub. Date: Jan. 17, 2019

(65) Prior Publication Data
US 2021/0016363 A1      Jan. 21, 2021

(30) Foreign Application Priority Data

Jul. 11, 2017  (JP) .............................. JP2017-135567
Oct. 6, 2017   (JP) .............................. JP2017-195958

(51) Int. Cl.
*B23B 27/16* (2006.01)
*B23B 29/04* (2006.01)
(Continued)

(52) U.S. Cl.
CPC ............ *B23B 27/1611* (2013.01); *B23B 1/00* (2013.01); *B23B 27/04* (2013.01); *B23B 29/043* (2013.01)

(58) Field of Classification Search
CPC ............... B23B 1/00; B23B 2220/123; B23B 2220/126; B23B 27/007; B23B 27/04; B23B 27/16; B23B 27/1611; B23B 29/043

See application file for complete search history.

(56) References Cited

U.S. PATENT DOCUMENTS 5,392,674 A * 2/1995 Mihic ................... B23B 27/007
407/104
6,109,152 A    8/2000 Hecht
(Continued)

FOREIGN PATENT DOCUMENTS

CN       1254303 A     5/2000
CN    102753288 A    10/2012
(Continued)

*Primary Examiner* — Nicole N Ramos
(74) *Attorney, Agent, or Firm* — Viering, Jentschura & Partner Mbb

(57) ABSTRACT

An insert may include a main body. The main body may include a first surface, a second surface, a side surface, a first cutting edge and a through hole. The side surface may be located between the first surface and the second surface. The first cutting edge may be located on at least a part of a ridge line where a first side surface of the side surface intersects with a second side surface adjacent to the first side surface. The through hole may open into the first surface. The main body may further include a first concave part located from the first surface to the side surface. The first concave part may be located away from an imaginary straight line connecting the first cutting edge and a center of the through hole in a front view of the first surface.

18 Claims, 29 Drawing Sheets

(51) Int. Cl.
*B23B 27/04* (2006.01)
*B23B 1/00* (2006.01)

(56) References Cited

U.S. PATENT DOCUMENTS

| | | | |
|---|---|---|---|
| 7,001,114 B2 * | 2/2006 | Blucher | ............ B23B 27/007 407/103 |
| 2011/0200408 A1 | 8/2011 | Hecht | |
| 2012/0201616 A1 | 8/2012 | Hecht | |
| 2013/0266384 A1 | 10/2013 | Hecht | |
| 2014/0294525 A1 | 10/2014 | Hecht | |

FOREIGN PATENT DOCUMENTS

| | | | | |
|---|---|---|---|---|
| CN | 105102165 A | 11/2015 | | |
| DE | 3402547 A1 * | 8/1985 | ........... | B23B 27/007 |
| JP | 2002512564 A | 4/2002 | | |
| JP | 2006187820 A | 7/2006 | | |
| JP | 2013519538 A | 5/2013 | | |
| JP | 2014504561 A | 2/2014 | | |
| JP | 2015512798 A | 4/2015 | | |
| JP | 2016514626 A | 5/2016 | | |

* cited by examiner ize: medium.">

CUTTING INSERT, CUTTING TOOL AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2018/026220 filed on Jul. 11, 2018, which claims priority to Japanese Application No. 2017-135567 filed on Jul. 11, 2017, and Japanese Application No. 2017-195958 filed on Oct. 6, 2017, which are entirely incorporated herein by reference.

TECHNICAL FIELD

The present disclosure relates to a cutting insert, a cutting tool, and a method for manufacturing a machined product. More specifically, the present disclosure relates to cutting tools for use in a grooving process.

BACKGROUND

As a cutting tool used in a cutting process of a workpiece, for example, a cutting tool is discussed in Japanese Unexamined Patent Publication No. 2014-504561 (Patent Document 1). An insert in the cutting tool discussed in Patent Document 1 may include a concave part located on a side of an upper surface. A holder in the cutting tool described in Patent Document 1 may include a convex part corresponding to the concave part. The insert may be stably constrained to the holder by fitting the concave part to the convex part. In the insert discussed in Patent Document 1, the concave part may be located on an imaginary line that connects a cutting edge of the insert and a central axis of a through hole in a front view of the upper surface.

SUMMARY

An insert in a non-limiting embodiment may include a main body. The main body may include a first surface, a second surface, a side surface, a first cutting edge and a through hole. The second surface may be located on an opposite side of the first surface. The side surface may be located between the first surface and the second surface. The first cutting edge may be located on at least a part of a ridge line where a first side surface of the side surface intersects with a second side surface adjacent to the first side surface. The through hole may open into the first surface and the second surface. The main body may further include a first concave part located from the first surface to the side surface. The first concave part may be located away from an imaginary straight line connecting the first cutting edge and a center of the through hole in a front view of the first surface.

DETAILED DESCRIPTION

Figure 1:
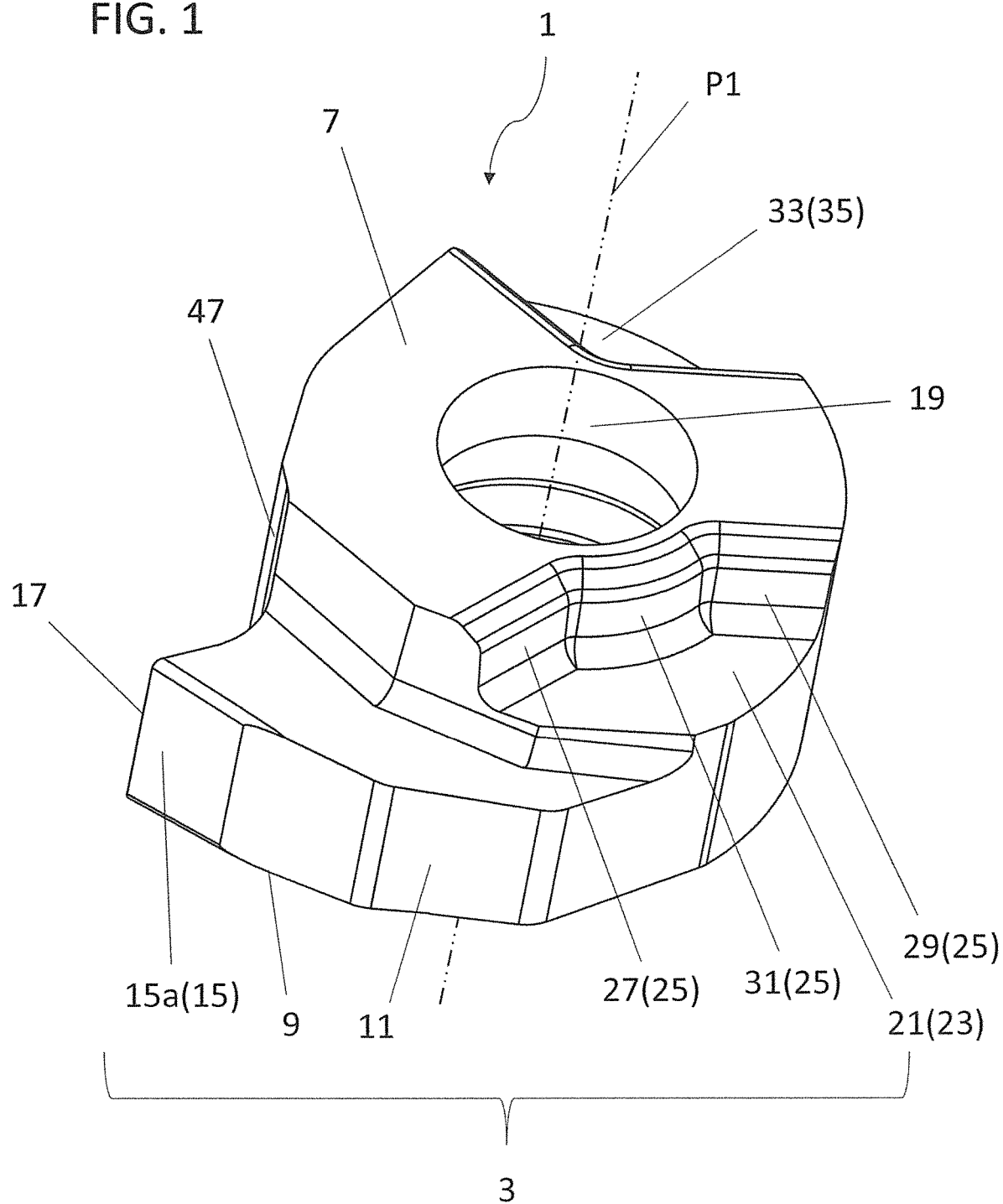
FIG. 1 is a perspective view illustrating a cutting insert in a non-limiting embodiment.

<Cutting Insert>
Cutting inserts 1 (hereinafter also referred to simply as "the inserts 1") in a plurality of non-limiting embodiments may be described in detail below with reference to the drawings. For convenience of description, the drawings referred to in the following illustrate, in simplified form, only main members necessary for describing the non-limiting embodiments. Therefore, the inserts 1 in the present disclosure are capable of including any arbitrary component not illustrated in the drawings referred to. Dimensions of the members in each of the drawings may not be ones which faithfully represent dimensions of actual structural members and dimension ratios of these members.

The insert 1 in a non-limiting embodiment may include a main body 3 having a flat plate shape as illustrated in FIG. 1.

Figure 2:
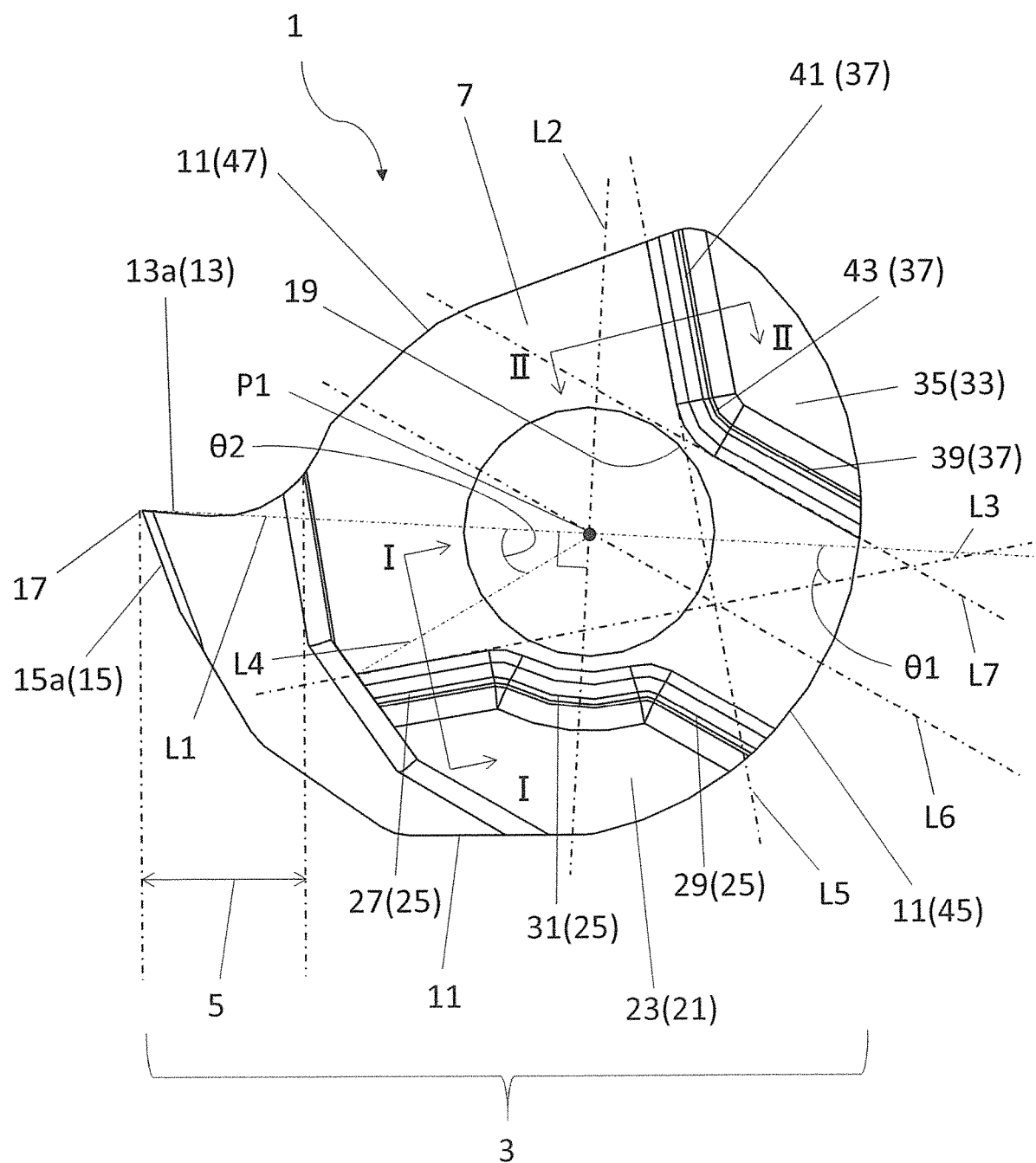
FIG. 2 is a plan view of the cutting insert illustrated in FIG. 1 in a front view of a first surface.

The main body 3 may include a first surface 7, a second surface 9 located on an opposite side of the first surface 7, and a side surface 11 located between the first surface 7 and the second surface 9. The first surface 7 and the second surface 9 may be parallel to each other as in the non-limiting embodiment illustrated in FIG. 1. The side surface 11 may include a first side surface 13 and a second side surface 15 adjacent to the first side surface 13 as illustrated in FIGS. 1 and 2.

The first side surface 13 may intersect with the second side surface 15. In this case, the main body 3 may include a first cutting edge 17 located on at least a part of a ridge line where the first side surface 13 intersects with the second side surface 15. The first side surface 13 may be extended from the first cutting edge 17 and may have a concave surface shape in the non-limiting embodiment illustrated in FIG. 2. The second side surface 15 may be extended from the first cutting edge 17 and may have a flat surface shape in the non-limiting embodiment illustrated in FIG. 2.

Figure 3:
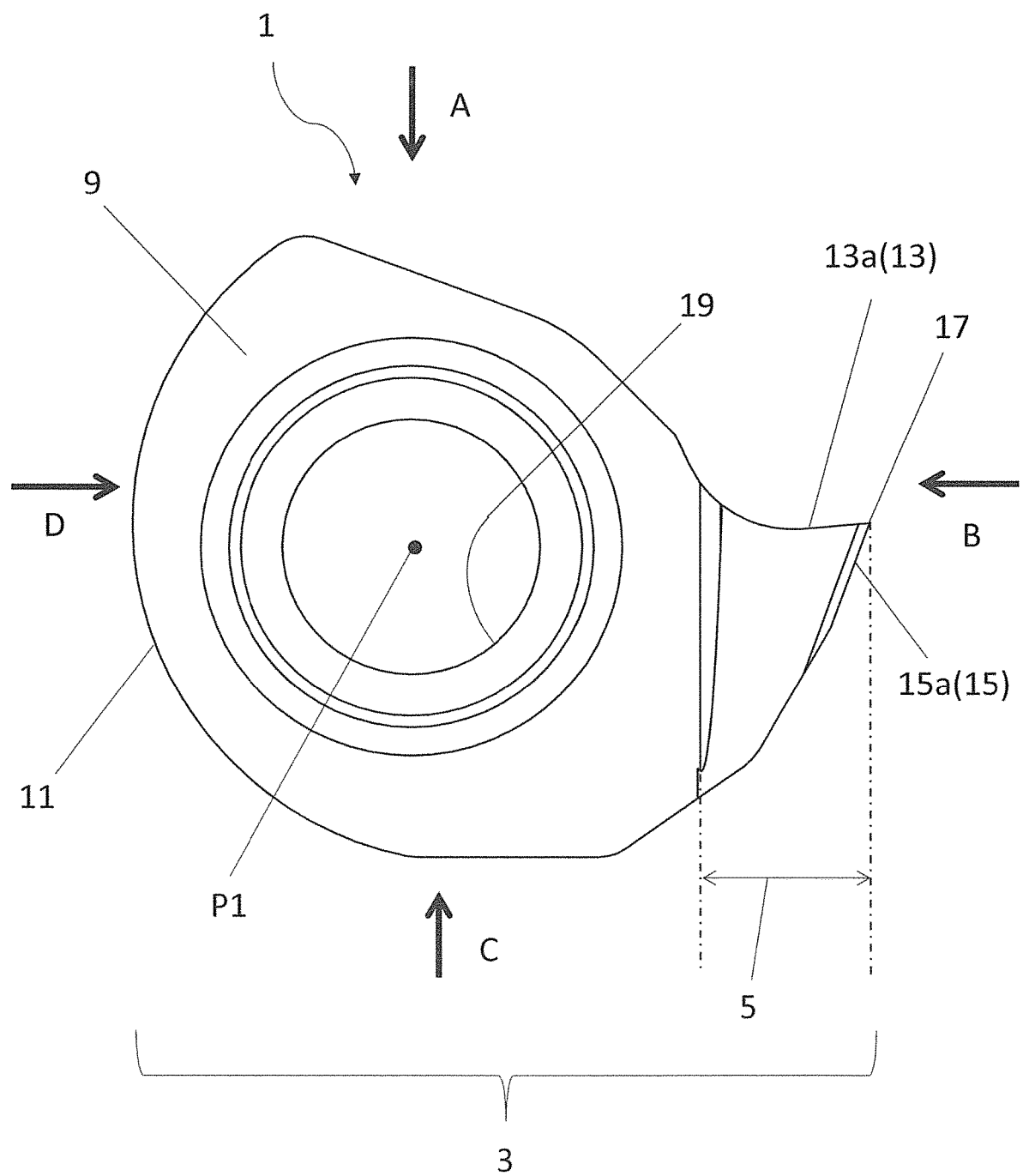
FIG. 3 is a plan view of the cutting insert illustrated in FIG. 1 in a front view of a second surface.
Figure 4:
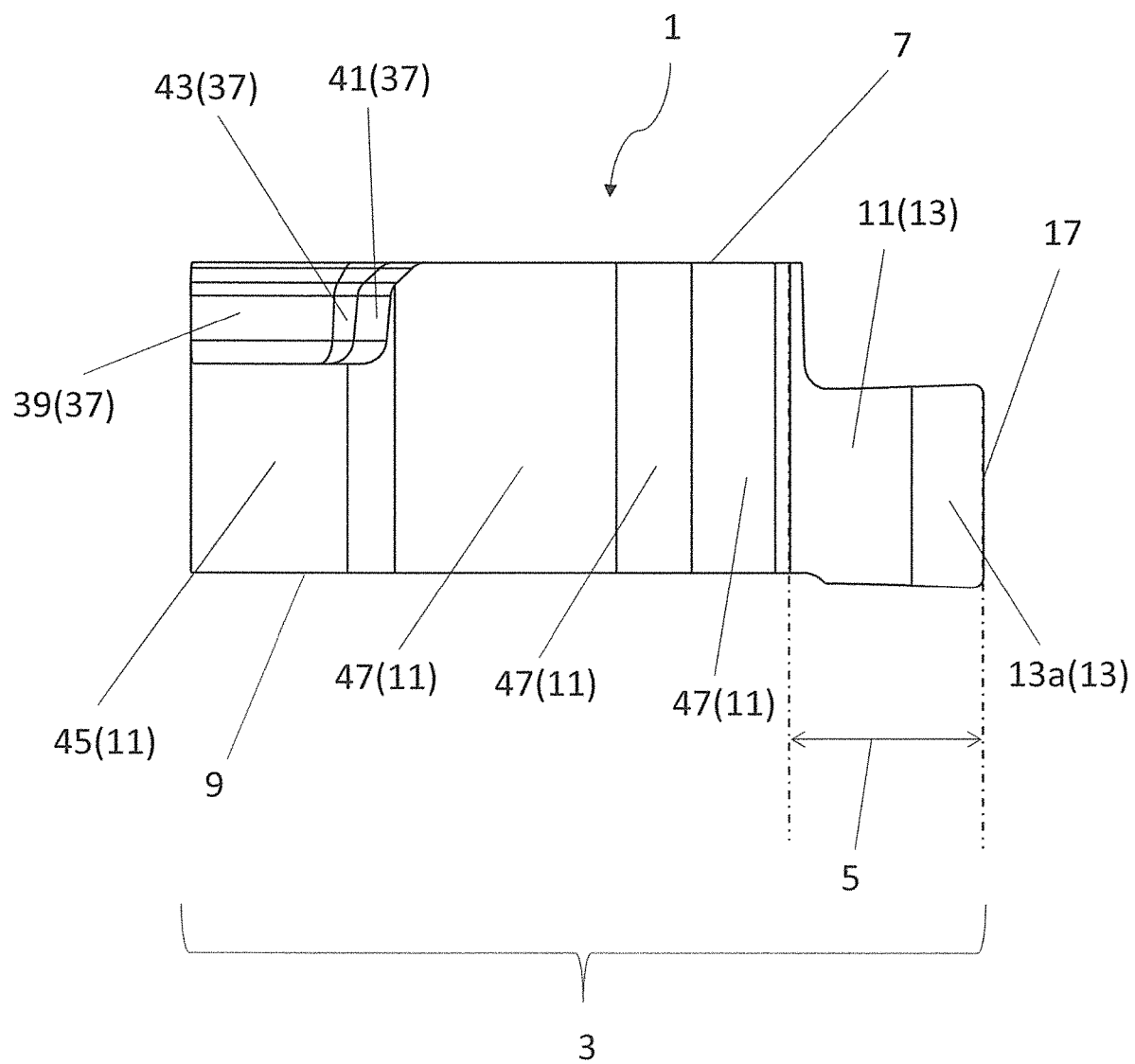
FIG. 4 is a side view of the cutting insert illustrated in FIG. 3 as viewed from direction A.
Figure 5:
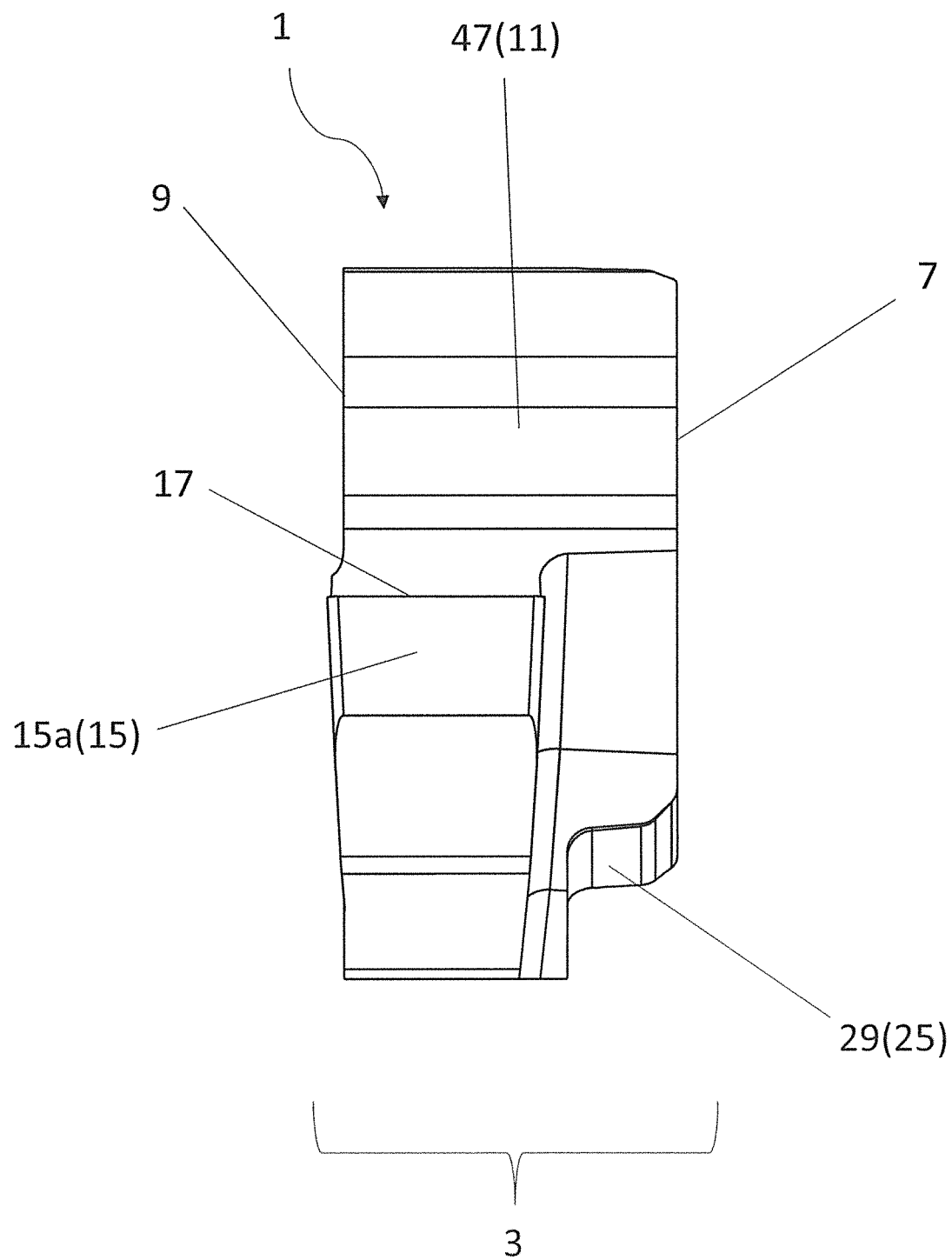
FIG. 5 is a side view of the cutting insert illustrated in FIG. 3 as viewed from direction B.

As illustrated in FIG. 3, the first side surface 13 may include a rake surface region 13a, and the second side surface 15 may include a flank surface region 15a. The rake surface region 13a may be a region that can be brought into contact with chips so as to curl the chips during a cutting process. In the non-limiting embodiment illustrated in FIG. 3, the rake surface region 13a may be located at a part of the first side surface 13 which is extended along the first cutting edge 17. The flank surface region 15a may be a region that is retreated so as to reduce contact with a finished surface of the workpiece during the cutting process. The flank surface region 15a may be located at a part of the second side surface 15 which is extended along the first cutting edge 17 in the non-limiting embodiment illustrated in FIG. 3. The flank surface region 15a may not be required to have no contact with the finished surface during the cutting process.

The first cutting edge 17 may be located on at least a part or the whole of the ridge line where the first side surface 13 intersects with the second side surface 15. A so-called honing process may be applied to the first cutting edge 17 located on the ridge line where the first side surface 13 intersects with the second side surface 15. In other words, the ridge line where the first side surface 13 intersects with the second side surface 15 may not be a strict line shape obtained by intersection of the two surfaces.

The main body 3 may include a through hole 19 that opens into the first surface 7 and the second surface 9 as illustrated in FIG. 1 or the like. The insert 1 may include a cutting part 5 constituted by the first side surface 13, the second side surface 15 and the first cutting edge 17 in the non-limiting embodiment illustrated in FIG. 1 or the like. The cutting part 5 may be protruded in a direction away from a central axis P1 of the through hole 19. The first cutting edge 17 may therefore be located most away from the central axis P1 of the through hole 19.

The through hole 19 may be used as a hole for insertion of a fixing tool when attaching the insert 1 to a holder. Examples of the fixing tool may include a screw, a wedge and a brazing material.

The main body 3 may have the flat plate shape as described above, and an outer diameter of each of the first surface 7 and the second surface 9 may be larger than a thickness of the main body 3. FIG. 1 may illustrate a non-limiting embodiment of the shape of the main body 3, however, it is not intended to limit the shape of the main body 3 to the shape illustrated in FIG. 1.

The main body 3 may include a first concave part 21 located from the first surface 7 to the side surface 11 in the non-limiting embodiment. The insert 1 may tend to be stably fixed to the holder by causing the first concave part 21 to abut against the holder in the non-limiting embodiment illustrated in FIG. 6.

The first concave part 21 may be located away from an imaginary straight line L1 in the front view of the first surface 7 of the main body 3 of the non-limiting embodiment. The imaginary straight line L1 may connect the first cutting edge 17 and the central axis P1 of the through hole 19. The central axis P1 may be orthogonal to the first surface 7 and the second surface 9. In this case, the central axis P1 may be indicated by a point in the front view of the first surface 7 as illustrated in FIG. 2.

The imaginary straight line L1 may be located on a region susceptible to a load during the cutting process. If the first concave part 21 is located away from the imaginary straight line L1 connecting the first cutting edge 17 and the central axis P1 of the through hole 19, it may be easy to ensure a thickness of the main body 3 in the region susceptible to the load during the cutting process. Consequently, the insert 1 may have high durability while the insert 1 may be stably fixable to the holder by the first concave part 21.

As stated earlier, the first side surface 13 may include the rake surface region 13a, and the second side surface 15 may include the flank surface region 15a. The first concave part 21 may not be located on a side of the first side surface 13 (an upper side in FIG. 2), but on a side of the second side surface 15 (a lower side in FIG. 2) with respect to the imaginary straight line L1 in the non-limiting embodiment illustrated in FIG. 2.

A principal force may be more likely to be applied to the first cutting edge 17 in a direction toward a side of the flank surface region 15a (a downward direction in FIG. 2) than in a direction toward a side of the rake surface region 13a (a rightward direction in FIG. 2) during the cutting process. If the first concave part 21 is located at a side of the second side surface 15 in the front view of the first surface 7, it may be easy to receive the principal force at a part of the holder which is opposed to a first wall surface 25. However, the insert 1 may tend to be stably fixed to the holder while avoiding an excessive load applied to the fixing tool.

The principal force may tend to be applied to the first cutting edge 17 in a direction toward the side of the flank surface region 15a during the cutting process. Therefore, the insert 1 may tend to rotate in a counterclockwise direction on the basis of the central axis P1 of the through hole 19 in the front view of the first surface 7. In this case, if the first concave part 21 is located at the above position, a part of the holder which is opposed to the first wall surface 25 may be located at the above position, a part of the holder which is opposed to the first wall surface 25 may be located at a relatively near position in the counterclockwise direction from the first cutting edge 17. Hence, the insert 1 may tend to be stably fixed to the holder.

Although the first concave part 21 may be in contact with or separated from the through hole 19, the first concave part 21 may be located away from the through hole 19 as in the non-limiting embodiment illustrated in FIG. 2. Because the insert 1 is fixed to the holder by the fixing tool, a load may tend to be applied to a periphery of the through hole 19 in the main body 3. If the first concave part 21 is located away from the through hole 19, a thickness of the periphery of the through hole 19 susceptible to the load can be ensured. A crack may be therefore less likely to occur in the periphery of the through hole 19.

Figure 6:
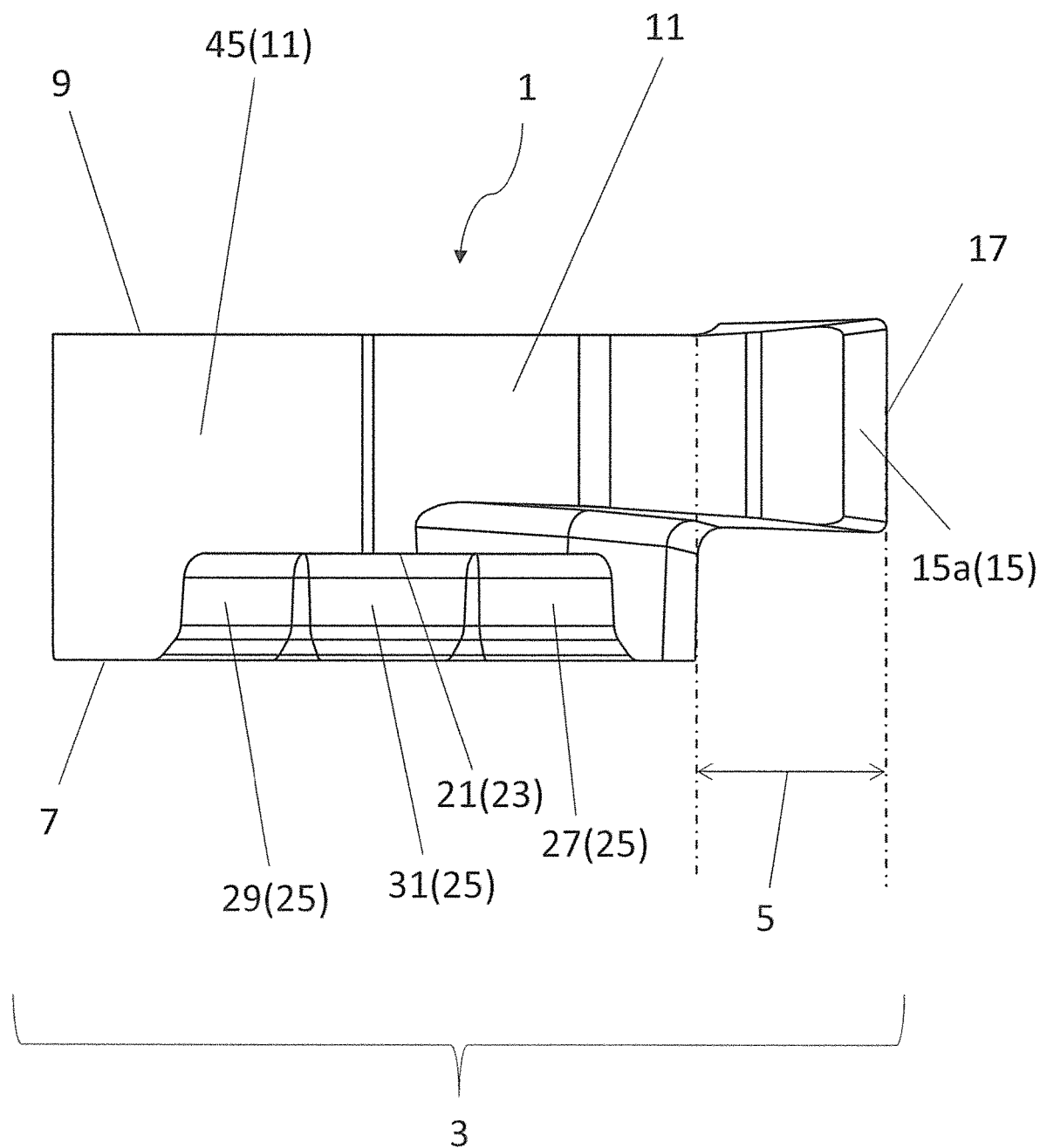
FIG. 6 is a side view of the cutting insert illustrated in FIG. 3 as viewed from direction C.

The first concave part 21 may include a first bottom surface 23 and a first wall surface 25 located between the first bottom surface 23 and the first surface 7 as illustrated in FIG. 6. The first bottom surface 23 may be located so as to be approximately orthogonal to the central axis P1, and the first wall surface 25 may be located so as to be approximately orthogonal to the first bottom surface 23 in the non-limiting embodiment illustrated in FIG. 6. The term "approximately orthogonal to" may be a concept which is not limited to such a configuration that is strictly orthogonal to, but which permits a range of approximately 80-100°.

The insert 1 may be stably fixable to the holder by causing the first bottom surface 23 and the first wall surface 25 in the insert 1 to abut against the holder. The first bottom surface 23 may be a concave surface or convex surface or, alternatively, a surface parallel to the first surface 7 as in the non-limiting embodiment illustrated in FIG. 6.

The first wall surface 25 may include a third surface 27 and a fourth surface 29 located with a vertical line L2 interposed therebetween. The vertical line L2 may be orthogonal to the imaginary straight line L1, and may pass through the central axis P1 of the through hole 19 in the non-limiting embodiment illustrated in FIG. 2. A surface located closer to the first cutting edge 17 than the vertical line L2 may be referred to as a third surface 27, and a surface located farther away from the first cutting edge 17 than the vertical line L2 may be referred to as a fourth surface 29.

If the first wall surface 25 may include the third surface 27, a part of the holder which is opposed to the third surface 27 may tend to be located closer to the first cutting edge 17 than the fixing tool. This may contribute to reducing the load applied to a fixing tool, and the insert 1 may be therefore more stably fixable by the part of the holder which is opposed to the third surface 27.

If the first wall surface 25 includes the fourth surface 29, the first wall surface 25 may tend to be located across the vertical line L2. This makes it possible to further reduce the load applied to the fixing tool, thus leading to more stable fixing of the insert 1.

Figure 7:
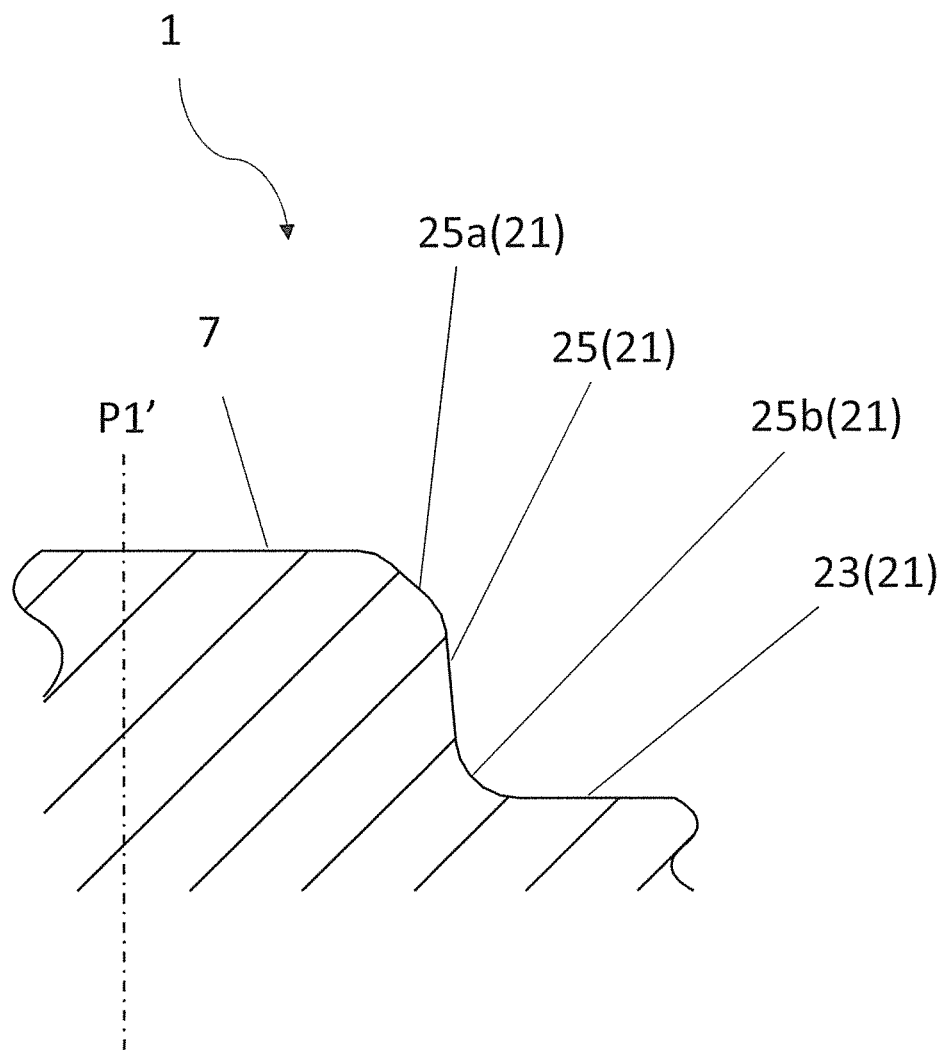
FIG. 7 is a sectional view illustrating a cross section taken along line I-I in FIG. 2.

The first wall surface 25 may be approximately parallel to the central axis P1 of the through hole 19 or, alternatively, may be inclined relative to the central axis P1 of the through hole 19. For the purpose of easy visual understanding, an imaginary straight line that intersects with the first surface 7 and is parallel to the central axis P1 of the through hole 19 may be referred to as an axis P1', and the axis P1' may be compared with the first wall surface 25 in the non-limiting embodiment illustrated in FIG. 7 or the like.

The term "parallel" need not to be a strict parallel positional relationship between two target portions. Specifically, the two target portions may be regarded as being parallel to each other even if inclined approximately 5°.

The insert 1 may include a connection surface 25a that connects the first wall surface 25 and the first surface 7, and a connection surface 25b that connects the first wall surface 25 and the first bottom surface 23.

An angle formed by an extension line of the imaginary straight line L1 and an imaginary straight line L3 of the ridge line where the first surface 7 intersects with the third surface 27 may be indicated by θ1 in the front view of the first surface 7. An angle formed by the extension line of the imaginary straight line L1 and an imaginary straight line L4 may be indicated by θ2 in the front view of the first surface 7. The imaginary straight line L4 may be a straight line that connects the central axis P1 and an end portion of the ridge line where the first surface 7 intersects with the third surface 27. The end portion may be at the largest distance from the central axis P1.

In cases where θ1 is smaller than θ2, the third surface 27 may be relatively approximately parallel to the imaginary straight line L1 in the front view of the first surface 7. A principal force applied to the first cutting edge 17 may tend to be received by a part of the holder which is opposed to the third surface 27. The insert 1 may be therefore stably fixable to the holder.

The first wall surface 25 may further include a fifth surface 31 located between the third surface 27 and the fourth surface 29 in the front view of the first surface 7. The fifth surface 31 may have a convex shape toward a side of the outer periphery of the main body 3. If the fifth surface 31 has the above configuration, it may be easy to ensure a large width between the first concave part 21 and the through hole 19. Consequently, a rack may be less likely to occur around the through hole 19.

In cases where the fifth surface 31 has the convex shape, the first concave part 21 may be located along the through hole 19 so that the width between the first concave part 21 and the through hole 19 may become constant. In this case, a crack may be much less likely to occur around the through hole 19.

The fifth surface 31 may have a concave shape with respect to a side of the outer periphery of the main body 3 in the front view of the first surface 7. It may be easy to ensure a large area of the first bottom surface 23 if the fifth surface 31 has the above configuration. The insert 1 may be therefore stably fixable to the holder.

Figure 8:
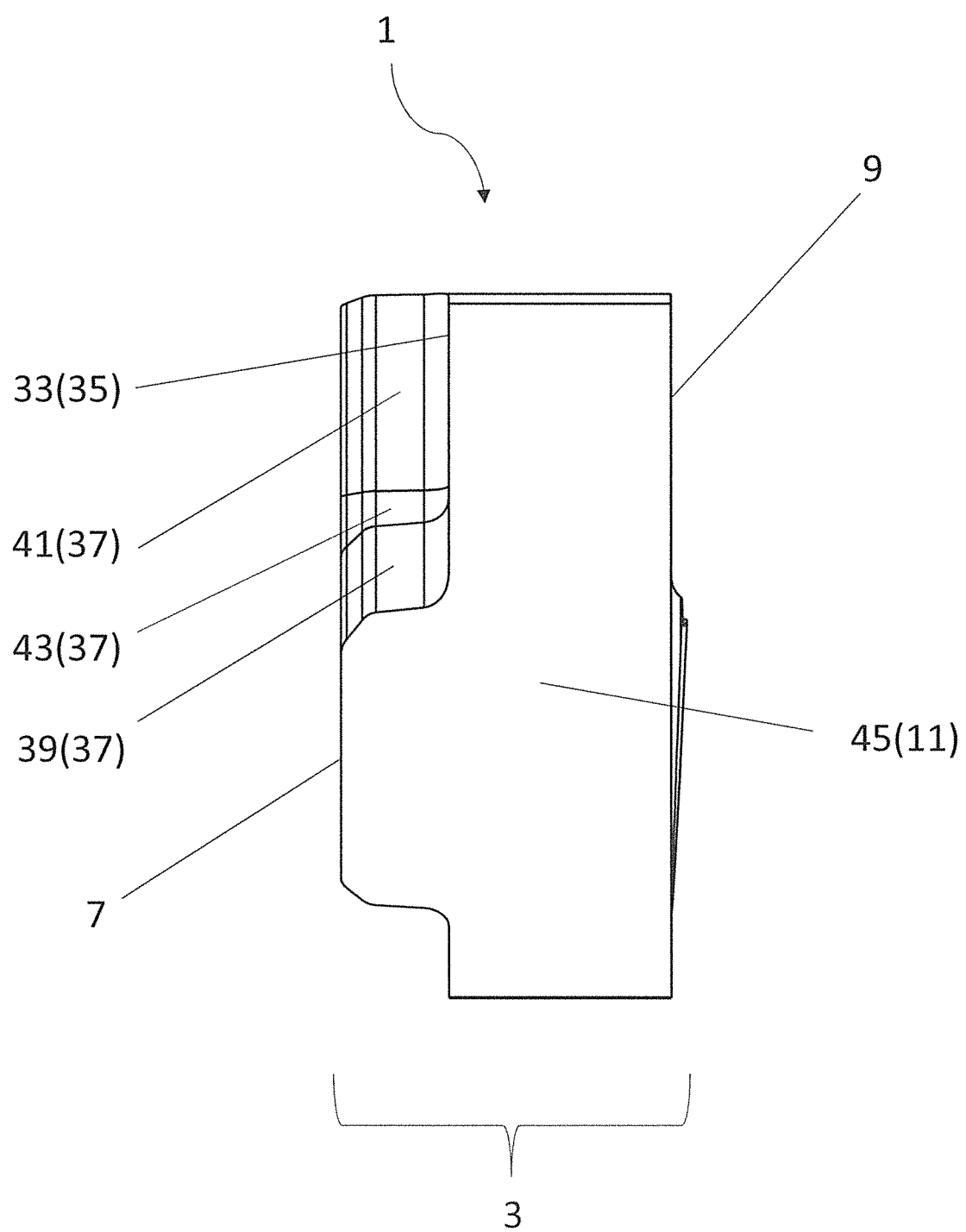
FIG. 8 is a side view of the cutting insert illustrated in FIG. 3 as viewed from direction D.
Figure 9:
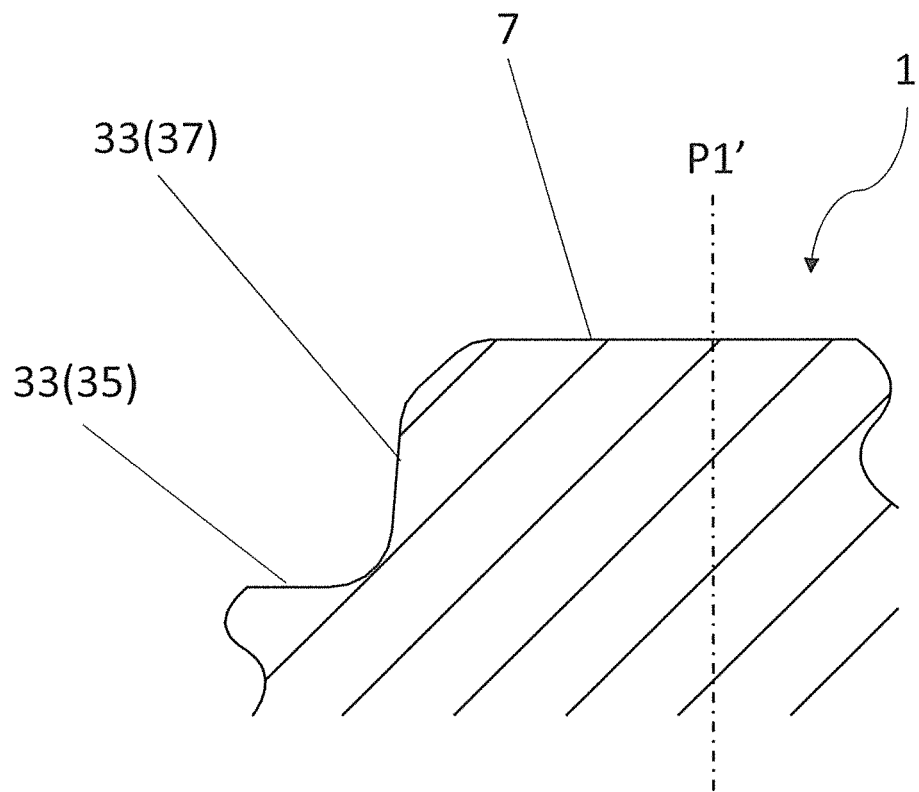
FIG. 9 is a sectional view illustrating a cross section taken along line II-II in FIG. 2.

The main body 3 may further include a second concave part 33 located from the first surface 7 to the side surface 11, in addition to the first concave part 21. The second concave part 33 may be located at a side of the first side surface 13 with respect to the imaginary straight line L1, and may be located farther away from the first cutting edge 17 than the central axis P1 of the through hole 19 as in the non-limiting embodiment illustrated in FIG. 2. Alternatively, the second concave part 33 may include a second bottom surface 35 and a second wall surface 37 located between the second bottom surface 35 and the first surface 7 as in the non-limiting embodiment illustrated in FIG. 8.

If the main body 3 includes the second concave part 33, the insert 1 may be stably fixable to the holder by causing the second concave part 33 in the insert 1 to abut against the holder.

The second wall surface 37 may include a sixth surface 39, a seventh surface 41 and an eighth surface 43 as in the non-limiting embodiment illustrated in FIG. 2. The sixth surface 39 and the seventh surface 41 may have a flat surface shape as in the non-limiting embodiment illustrated in FIG. 2. The eighth surface 43 may be located between the sixth surface 39 and the seventh surface 41, and may have a concave shape toward a side of the outer periphery of the main body 3.

Of the sixth surface 39 and the seventh surface 41, a surface that is located relatively close to the first cutting edge 17 may be the seventh surface 41 in the non-limiting embodiment illustrated in FIG. 2. Of the sixth surface 39 and the seventh surface 41, a surface that is located relatively far away from the first cutting edge 17 may be the sixth surface 39. The second bottom surface 35 may be parallel to the first surface 7 as in the non-limiting embodiment illustrated in FIG. 2. The sixth surface 39 and the seventh surface 41 in the second wall surface 37 may be individually parallel to the central axis P1.

Figure 10:
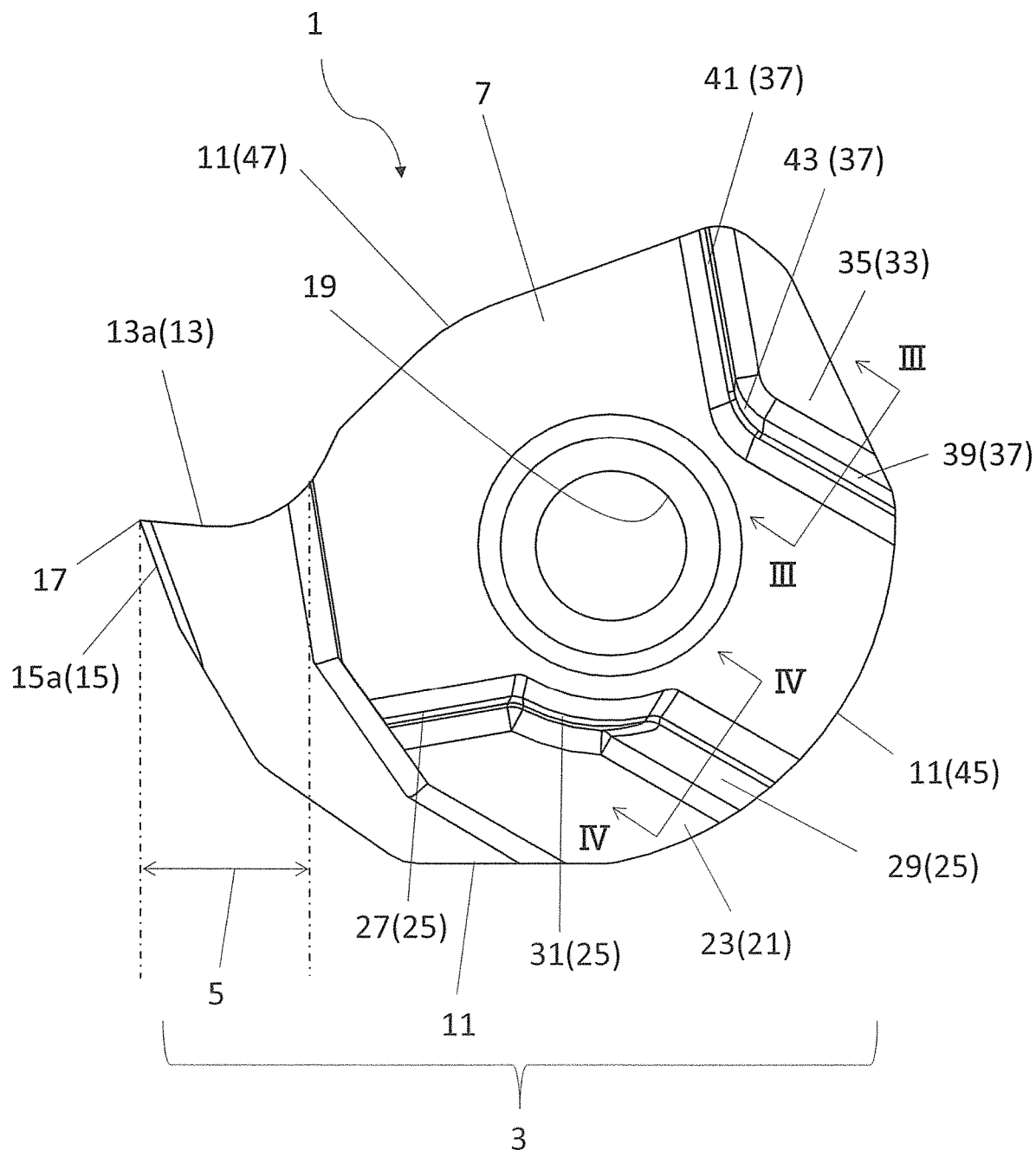
FIG. 10 is a plan view of another non-limiting embodiment of the cutting insert illustrated in FIG. 2.
Figure 11:
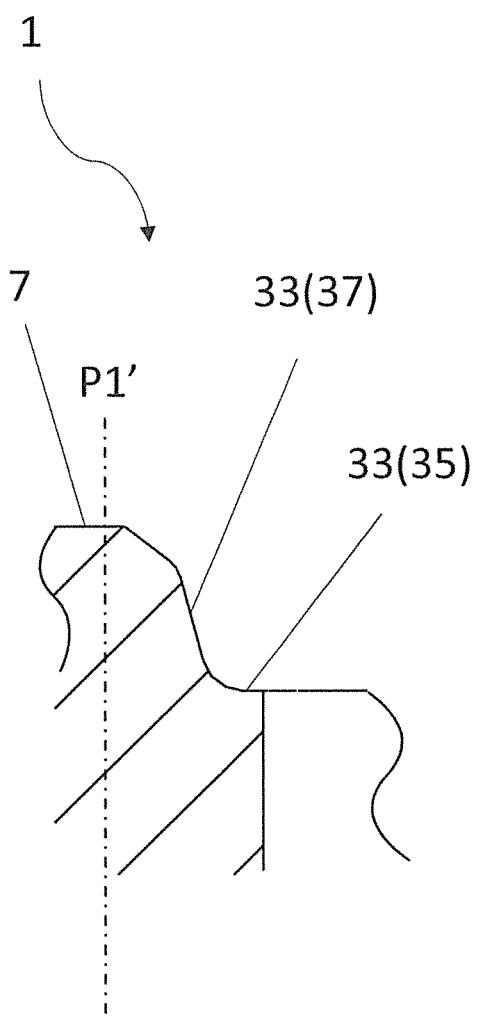
FIG. 11 is a sectional view illustrating a cross section taken along line III-III in FIG. 10.
Figure 12:
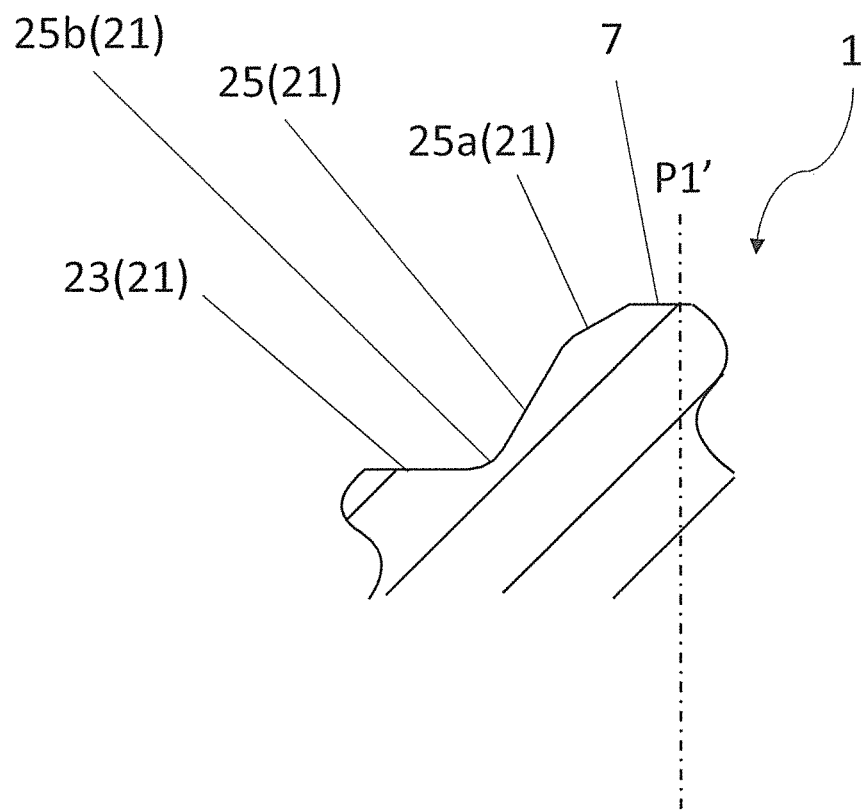
FIG. 12 is a sectional view illustrating a cross section taken along line IV-IV in FIG. 10.

The sixth surface 39 and the seventh surface 41 in the second wall surface 37 may be individually parallel to the central axis P1 or, alternatively, may be individually inclined relative to the central axis P1. The sixth surface 39 may be inclined so as to approach an axis P1' as going from a side of the second bottom surface 35 to a side of the first surface 7 in the non-limiting embodiment illustrated in FIGS. 10 to 12. FIGS. 10 to 12 may illustrate a cross section orthogonal to the first surface 7 and the sixth surface 39.

A principal force may be applied to the first cutting edge 17 in a direction toward a side of the flank surface region 15a (in a downward direction in FIG. 10) during the cutting process. The insert 1 may tend to rotate in the counterclockwise direction on the basis of the central axis P1 of the through hole 19 in the front view of the first surface 7. With the above configuration, even though the force is applied to a part of the holder opposed to the sixth surface 39, the force may tend to be dispersed not only in a rotation direction of the insert 1 (in a rightward direction in FIG. 11) but also in a direction along the central axis P1 of the through hole 19 (in a downward direction in FIG. 11). The insert 1 and the holder may be therefore less likely to be deformed, and hence both may have improved durability.

The fourth surface 29 may be inclined so as to approach the axis P1' as going from a side of the first bottom surface 23 toward a side of the first surface 7 as in the non-limiting embodiment illustrated in FIG. 12. FIG. 12 may illustrate a cross section orthogonal to the first surface 7 and the fourth surface 29. An inclination angle of the fourth surface 29 relative to the axis P1' is settable to, for example, approximately 20-70°.

The main body 3 may be subjected to force that attempts to rotate in the counterclockwise direction on the basis of the central axis P1 of the through hole 19 in the front view of the first surface 7, due to the principal force applied during the cutting process. The insert 1 can be held against the above force by the part of the holder which is opposed to the sixth surface 39. The insert 1 can be held against thrust force applied to the main body 3 during the cutting process by the part of the holder which is opposed to the seventh surface 41.

Of the third surface 27 and the fourth surface 29, a surface located away from the first cutting edge 17 may be the fourth surface 29. Of the sixth surface 39 and the seventh surface 41, a surface located away from the first cutting edge 17 may be the sixth surface 39. A distance between a ridge line where the first surface 7 intersects with the fourth surface 29 and a ridge line where the first surface 7 intersects with the sixth surface 39 may become larger as going away from the first cutting edge 17 in the front view of the first surface 7.

Alternatively, the ridge line where the first surface 7 intersects with the fourth surface 29, and the ridge line where the first surface 7 intersects with the sixth surface 39 may be extended in a parallel direction. If the first concave part 21 and the second concave part 33 have the above configuration, it may become easier to attach the insert 1 to the holder.

Still alternatively, a bisector L6 of an angle formed by the imaginary extension line L3 and the imaginary extension line L5 may be parallel to a ridge line where the first surface 7 intersects with the fourth surface 29 in the front view of the first surface 7. Alternatively, the bisector L6 may be parallel to a ridge line where the first surface 7 intersects with the sixth surface 39. The imaginary extension line L3 may indicate a ridge line where the first surface 7 intersects with the third surface 27. The imaginary extension line L5 may indicate a ridge line where the first surface 7 intersects with the seventh surface 41. If the first concave part 21 and the second concave part 33 have the above configuration, it may be easy to stably fix the inset 1 to the holder while it may be easy to attach the insert 1 to the holder.

The bisector L6 need not be strictly parallel to the ridge line where the first surface 7 intersects with the fourth surface 29, but may be inclined approximately −10 to 10°. Similarly, the bisector L6 need not be strictly parallel to the ridge line where the first surface 7 intersects with the sixth surface 39, but may be inclined approximately −10 to 10°.

In the front view of the first surface 7, the imaginary extension line L3 may intersect with the imaginary extension line L7 on the outside of the insert 1. The imaginary extension line L7 may indicate a ridge where the first surface 7 intersects with the sixth surface 39.

If an intersection where the imaginary extension line L3 intersects with the imaginary extension line L7 is located on the outside of the insert 1, a width of a surface interposed between the fourth surface 29 and the sixth surface 39 may be large in a direction vertical to the fourth surface 29 and the sixth surface 39. It may be therefore easy to ensure a thickness of the surface interposed between the fourth surface 29 and the sixth surface 39, thus leading to enhanced fracture resistance of the insert 1.

The side surface 11 may include a third side surface 45 and a fourth side surface 47 as in the non-limiting embodiment illustrated in FIG. 2. The third side surface 45 may be located farther away from the first cutting edge 17 than a vertical line L2, and a radius of curvature may be constant as in the non-limiting embodiment illustrated in FIG. 2. The fourth side surface 47 may be located between the third side surface 45 and the first side surface 13, and may have a smaller distance to the through hole 19 than the third side surface 45.

If the side surface 11 includes the third side surface 45 and the fourth side surface 47, chips generated by the first cutting edge 17 may pass over the first side surface 13 including the rake surface region 13a and may flow to the fourth side surface 47. If the distance to the through hole 19 on the fourth side surface 47 is relatively small as described above, it may be easy to ensure space for passage of the chips on the fourth side surface 47. Accordingly, the insert 1 satisfying this configuration may have enhanced chip discharge performance.

Sizes of the main body 3 are not particularly limited. For example, a length from the central axis P1 to the first cutting edge 17 may be approximately 3-20 mm in the front view of the first surface 7. A distance between the first surface 7 and the second surface 9 may be, for example, approximately 2-20 mm.

For example, cemented carbide and cermet are usable as a material of the insert 1. Examples of composition of the cemented carbide may include WC—Co, WC—TiC—Co and WC—TiC—TaC—Co. The WC—Co may be produced by adding cobalt (Co) powder to tungsten carbide (WC), followed by sintering. The WC—TiC—Co may be produced by adding titanium carbide (TiC) to WC—Co. The WC—TiC—TaC—Co may be produced by adding tantalum carbide (TaC) to WC—TiC—Co.

The cermet may be a sintered composite material obtainable by compositing metal into a ceramic ingredient. Examples of the cermet may include ones which are composed mainly of a titanium compound, such as titanium carbide (TiC) and titanium nitride (TiN).

A surface of the insert 1 may be coated with a coating film by using a chemical vapor deposition (CVD) method or a physical vapor deposition (PVD) method. Examples of composition of the coating film may include titanium carbide (TiC), titanium nitride (TiN), titanium carbonitride (TiCN) and alumina ($Al_2O_3$).

A different cutting insert 1' in the non-limiting embodiment may be described below with reference to the drawings. The following description of the insert 1' in this non-limiting embodiment may be focused on differences from the insert 1 in the foregoing non-limiting embodiment. Therefore, the insert 1' may include configurations similar to those in the insert 1. Descriptions of the similar configurations may be omitted in some cases.

Figure 13:
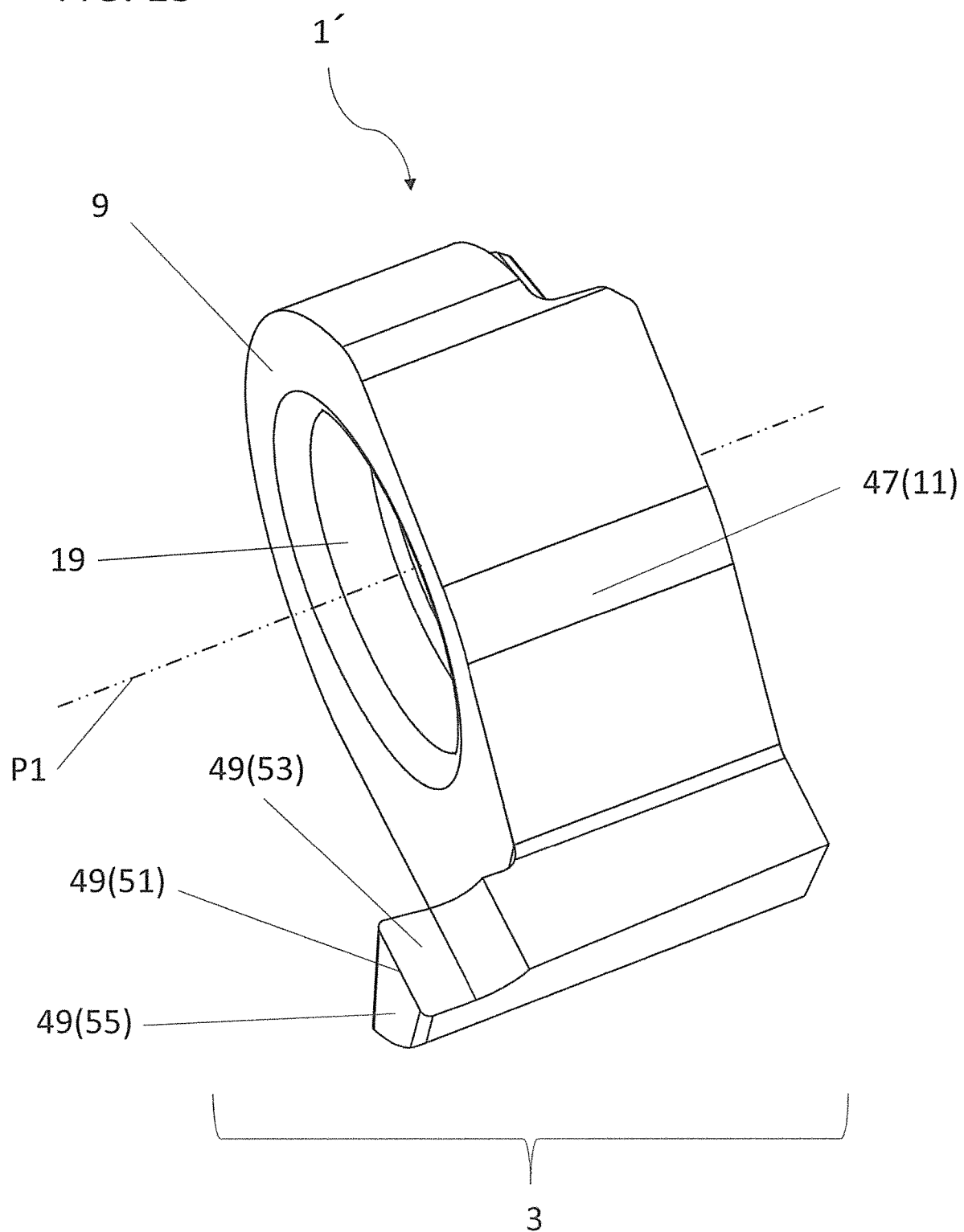
FIG. 13 is a perspective view illustrating a cutting insert in a non-limiting embodiment.

The different insert 1' of this non-limiting embodiment may include a main body 3 having an approximately flat plate shape as illustrated in FIG. 13.

The main body 3 may include a first surface 7, a second surface 9 located on an opposite side of the first surface 7, and a side surface 11 located between the first surface 7 and the second surface 9. The main body 3 may include a through hole 19 that opens into the first surface 7 and the second surface 9. The main body 3 may include a protruded part 49 located on the second surface 9 and protruded from the second surface 9 in a direction away from the first surface 7. The protruded part 49 may correspond to the cutting part in the foregoing insert 1.

The protruded part 49 in the non-limiting embodiment illustrated in FIG. 13 may be protruded in a direction along a central axis P1 of the through hole 19. The protruded part 49 may include a second cutting edge 51 located at a portion most away from the first surface 7. Specifically, the protruded part 49 may include a first protruded surface 53 that extends from the second surface 9 and may include a rake surface region, and a second protruded surface 55 which is adjacent to the first protruded surface 53 and located at a front end of the protruded part 49, and which includes a flank surface region. The protruded part 49 may include the second cutting edge 51 located on at least a part of a ridge line where the first protruded surface 53 intersects with the second protruded surface 55.

As described above, the insert 1 may include the first cutting edge 17 located on at least the part of the ridge line where the first side surface 13 intersects with the second side surface 15, and may also include the second cutting edge 51 located on at least the part of the ridge line where the first protruded surface 53 intersects with the second protruded surface 55.

Figure 14:
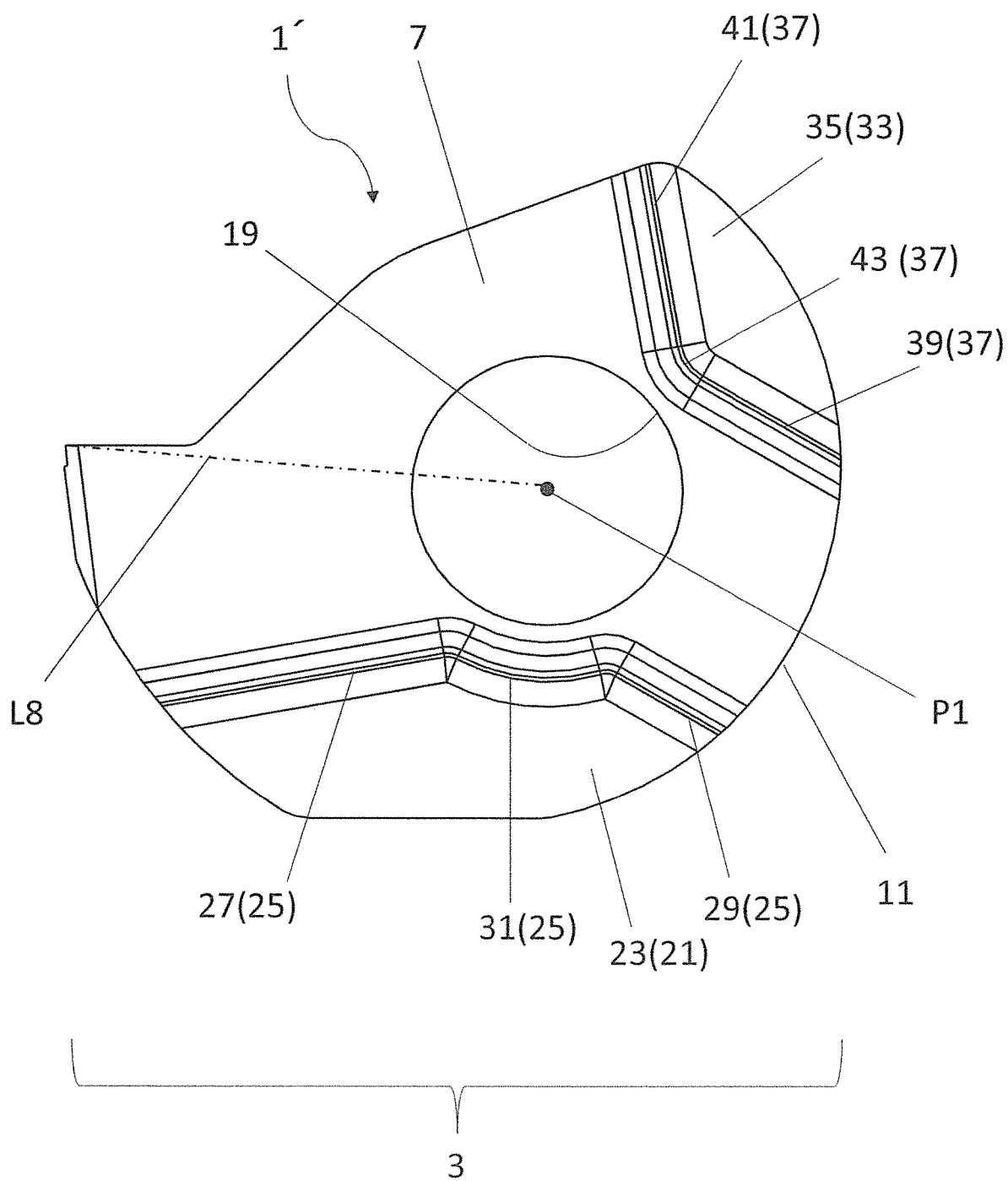
FIG. 14 is a plan view of the cutting insert illustrated in FIG. 13 in a front view of a first surface.
Figure 15:
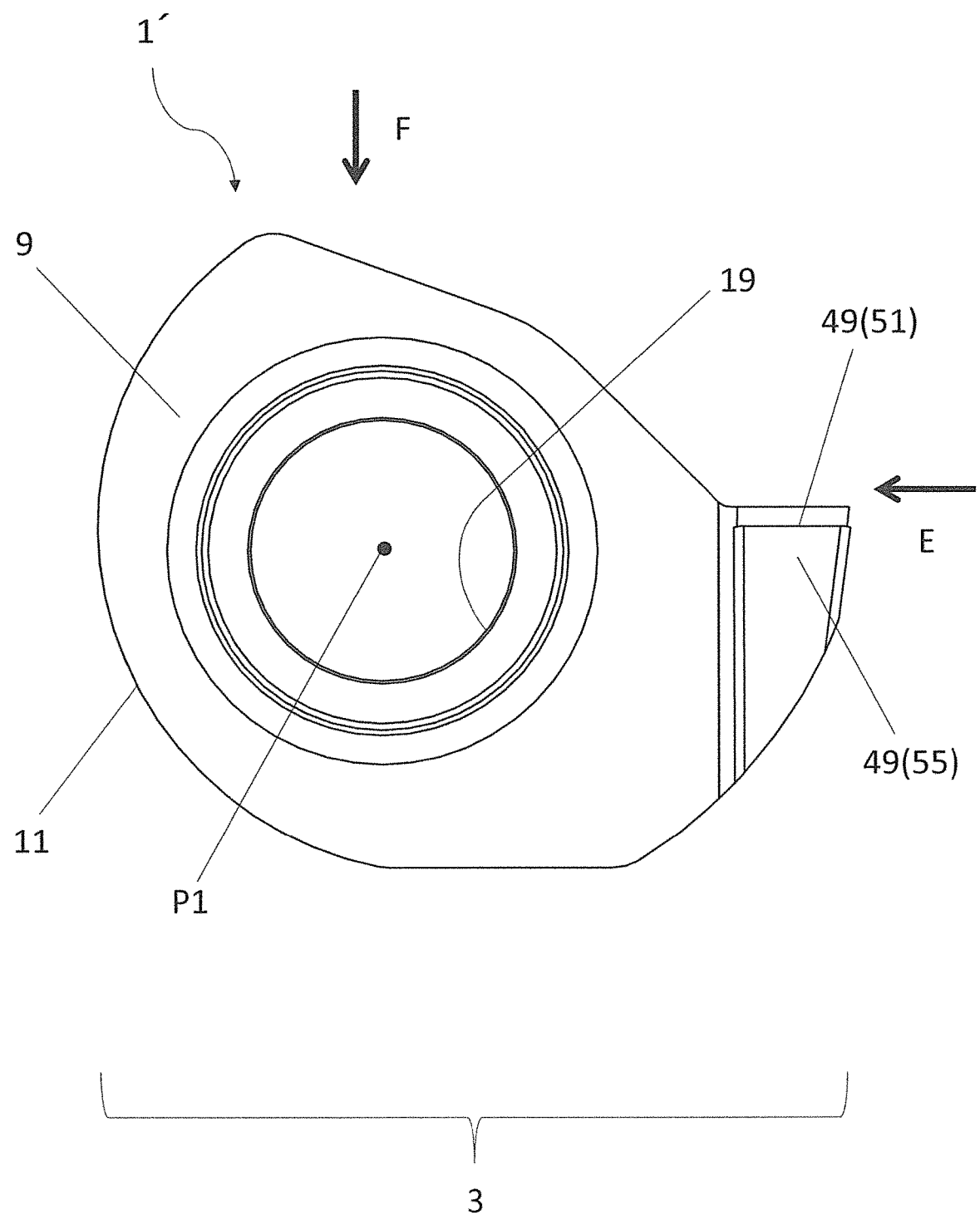
FIG. 15 is a plan view of the cutting insert illustrated in FIG. 13 in a front view of a second surface.
Figure 16:
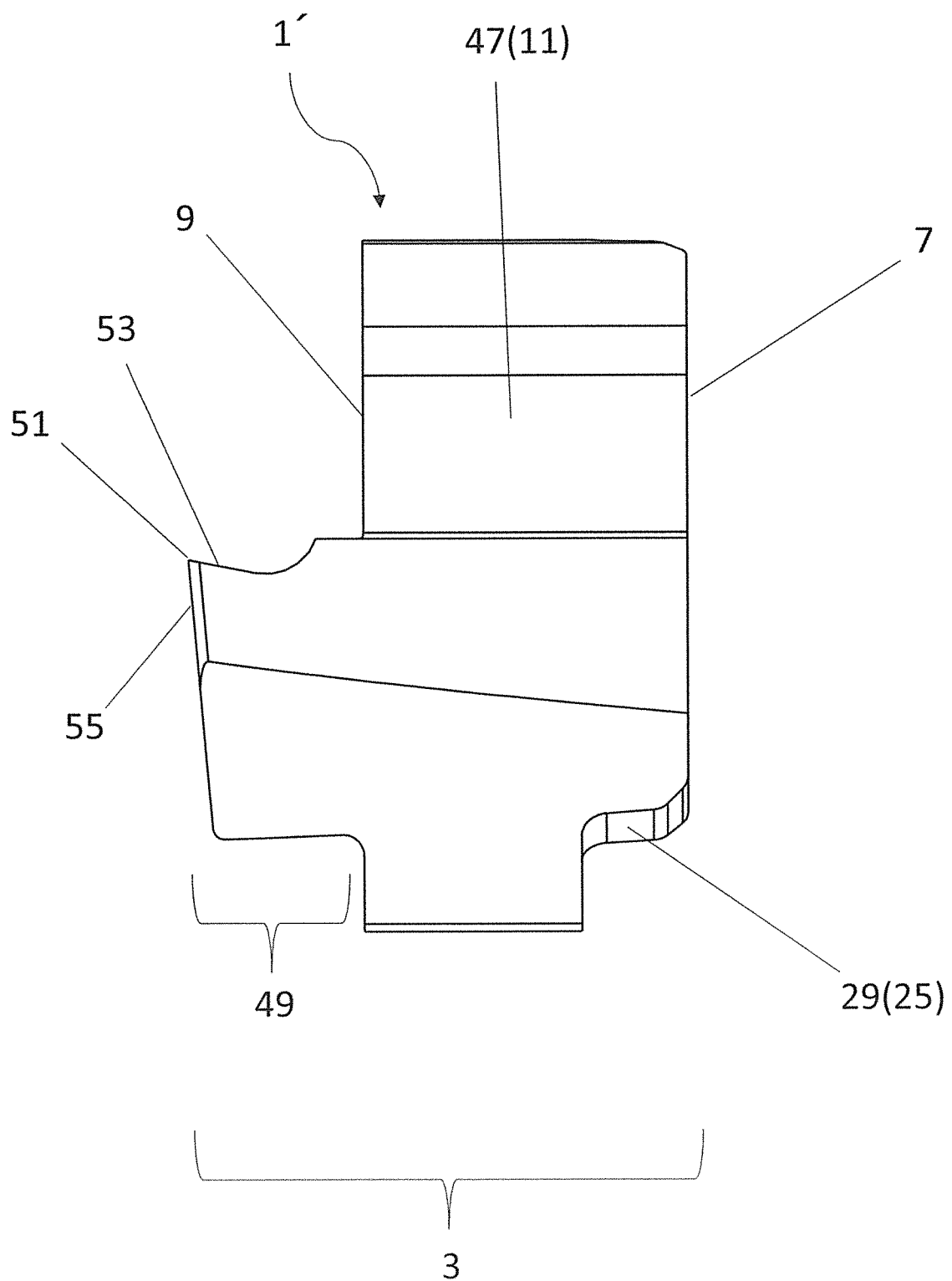
FIG. 16 is a side view of the cutting insert illustrated in FIG. 15 as viewed from direction E.
Figure 17:
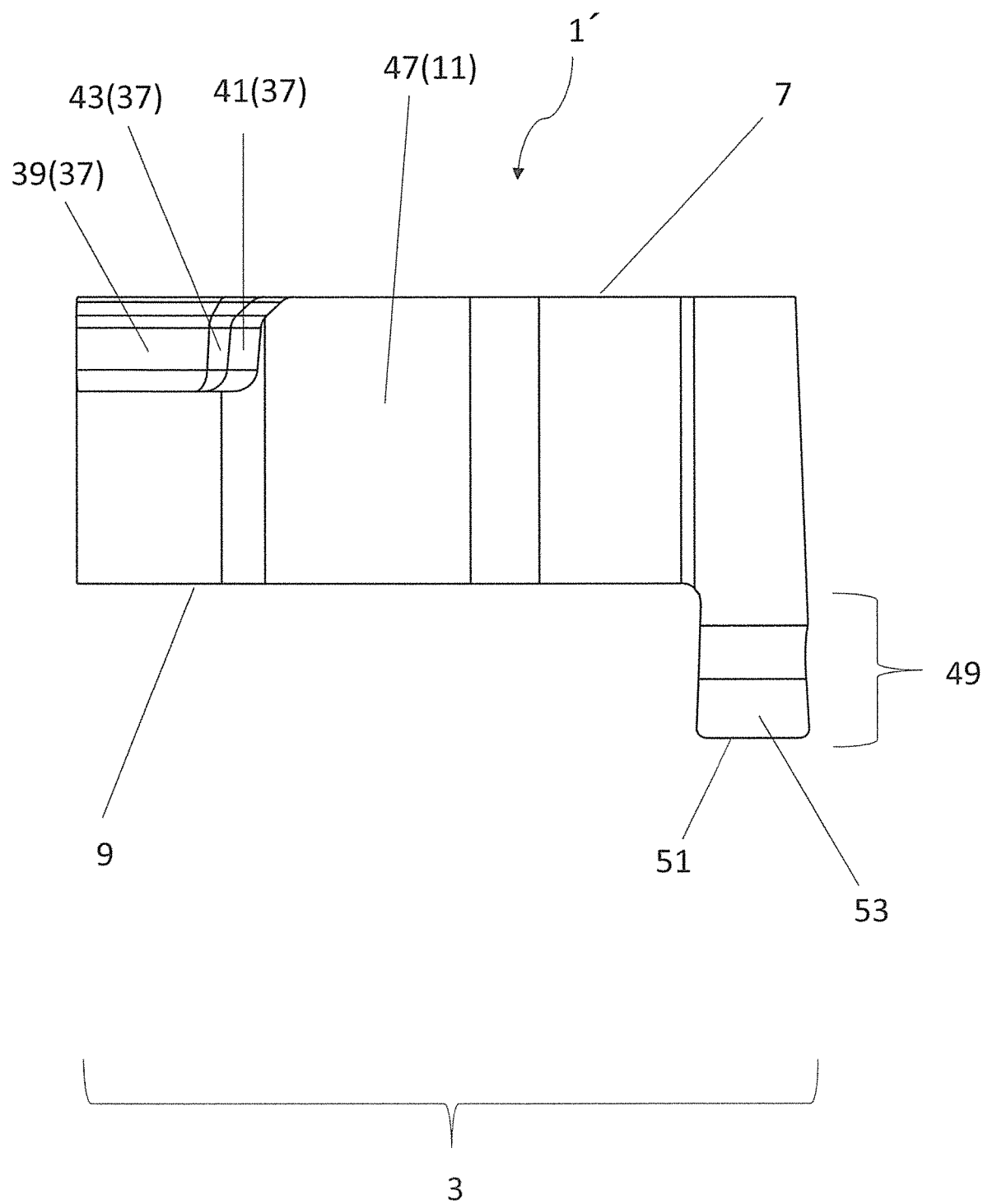
FIG. 17 is a side view of the cutting insert illustrated in FIG. 15 as viewed from direction F.

The main body 3 may include a first concave part 21 located from the first surface 7 to the side surface 11. The first concave part 21 may include a first bottom surface 23 and a first wall surface 25 located between the first bottom surface 23 and the first surface 7 in the non-limiting embodiment illustrated in FIG. 14. The insert 1' may be easily fixable to a holder by causing the first bottom surface 23 and the first wall surface 25 in the insert 1' to abut against the holder.

The first concave part 21 may be located away from an imaginary straight line L8 in a transparent plan view of the first surface 7 taken from the front. The imaginary straight line L8 may connect a center of the second cutting edge 51 and the central axis P1 of the through hole 19. Similar to the insert 1, the insert 1' in the non-limiting embodiment illustrated in FIG. 14 may have the above configuration and hence may have enhanced durability on the imaginary straight line L8 susceptible to a load during a cutting process.

<Cutting Tool>

A cutting tool in a non-limiting embodiment of the present disclosure may be described below with reference to the drawings.

Figure 18:
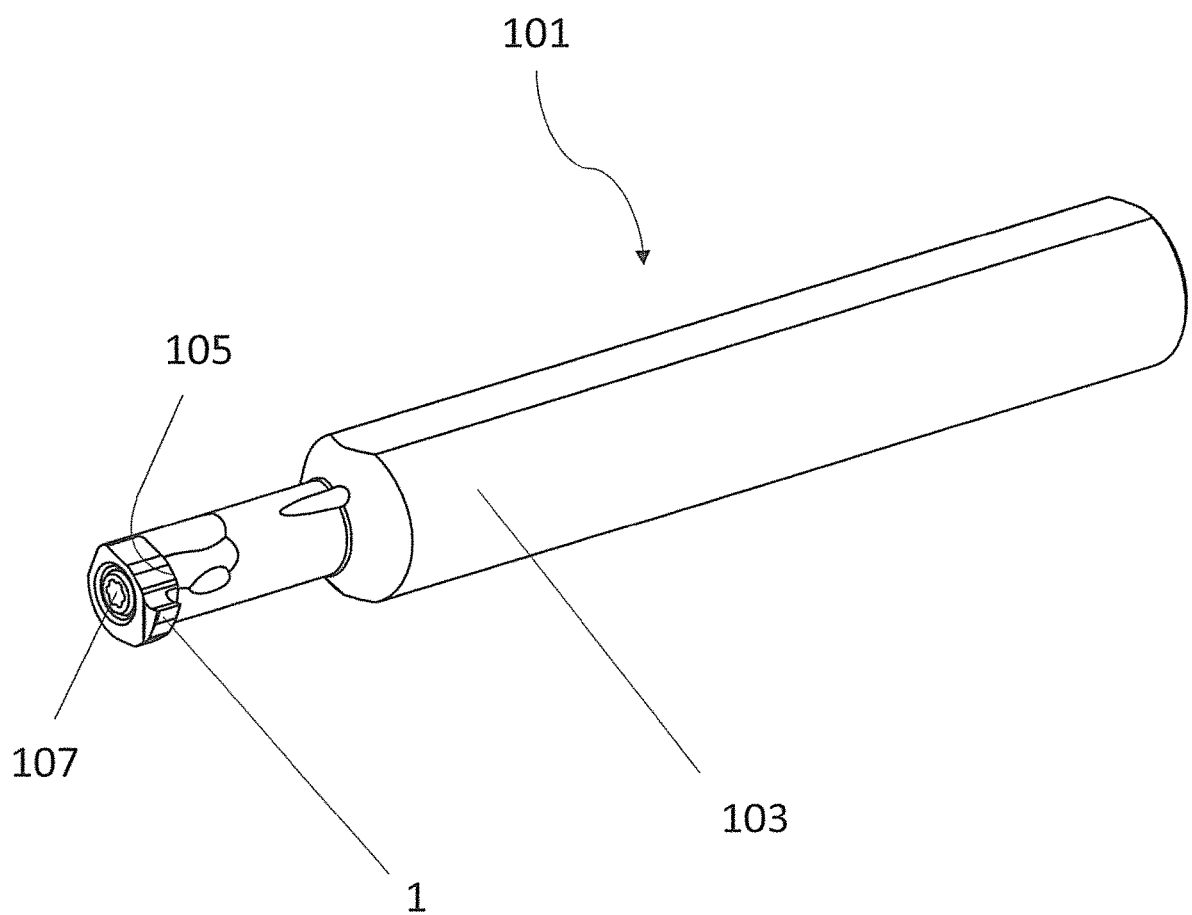
FIG. 18 is a perspective view illustrating a cutting tool in a non-limiting embodiment.

As illustrated in FIG. 18 or the like, the cutting tool 101 of the non-limiting embodiment may include a holder 103 and the insert 1 as represented by the foregoing non-limiting embodiment. FIGS. 18 to 22 may illustrate the insert 1 as a cutting insert. There is no problem even if the cutting tool 101 includes the insert 1' instead of the insert 1.

The holder 103 may have a bar shape extended from a first end 103a (a lower left end in FIG. 18) to a second end 103b (an upper right end in FIG. 18), and may include a pocket 105 on a side of the first end 103a.

Figure 19:
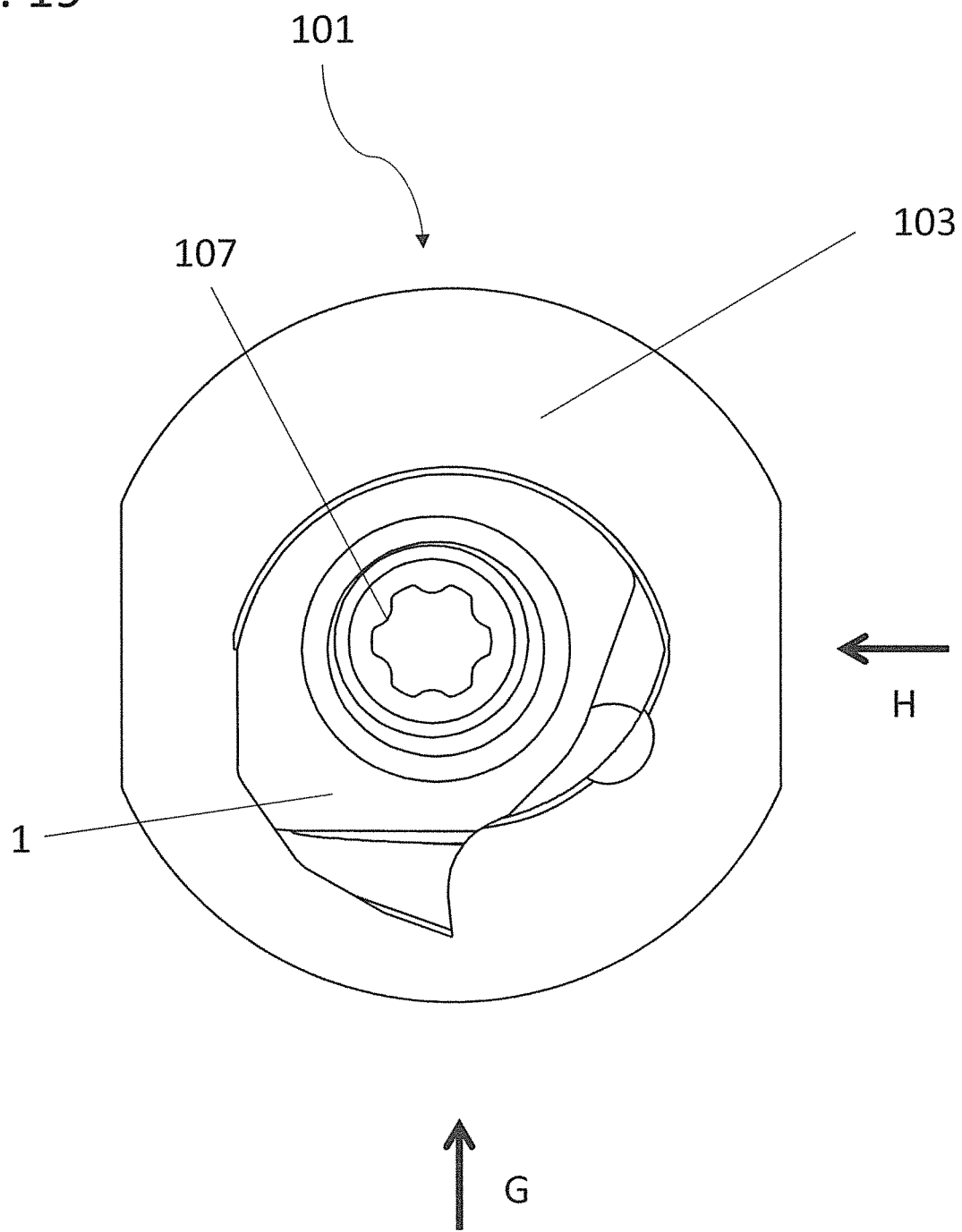
FIG. 19 is a plan view of the cutting tool illustrated in FIG. 18 as viewed toward a first end.
Figure 20:
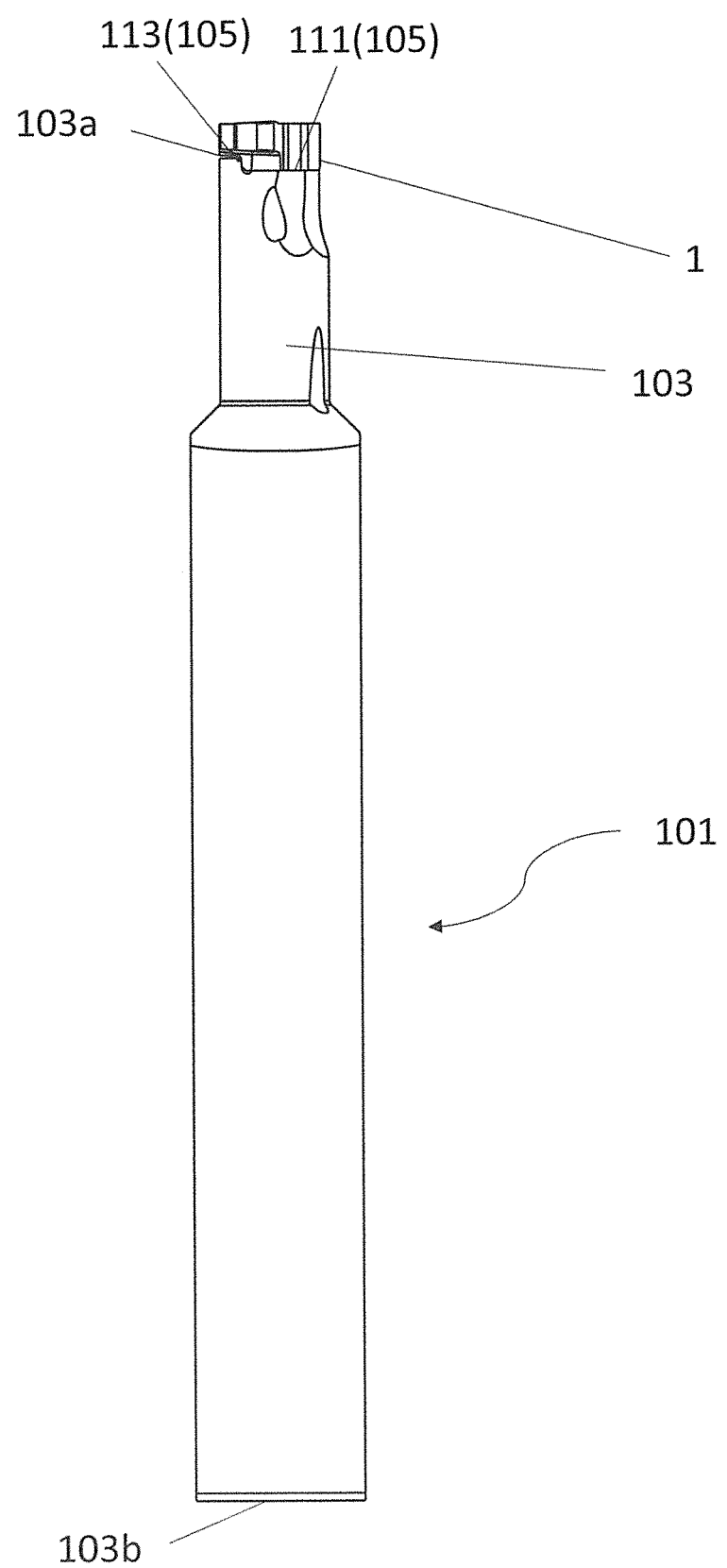
FIG. 20 is a side view of the cutting tool illustrated in FIG. 19 as viewed from direction G.
Figure 21:
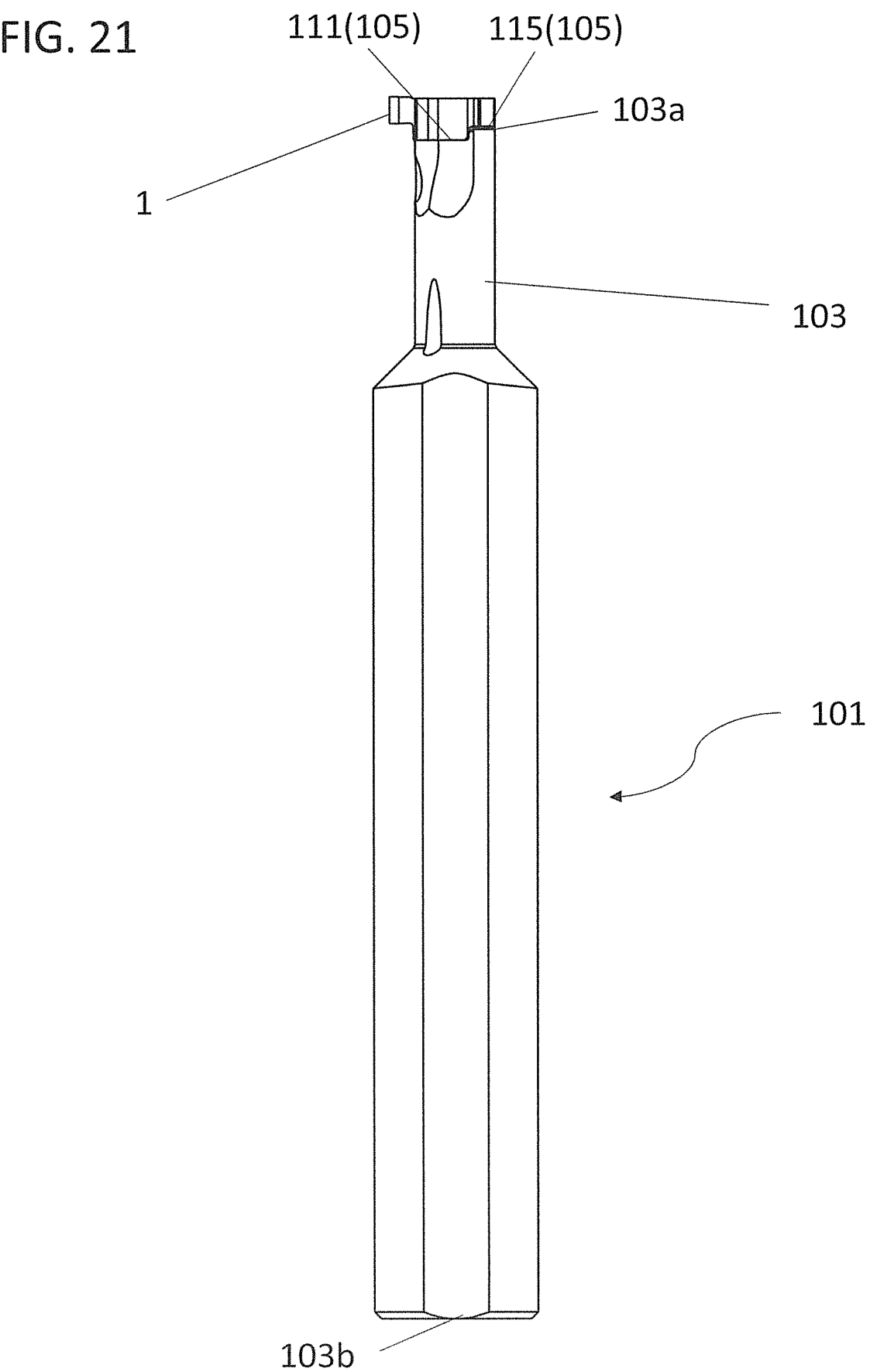
FIG. 21 is a side view of the cutting tool illustrated in FIG. 19 as viewed from direction H.
Figure 22:
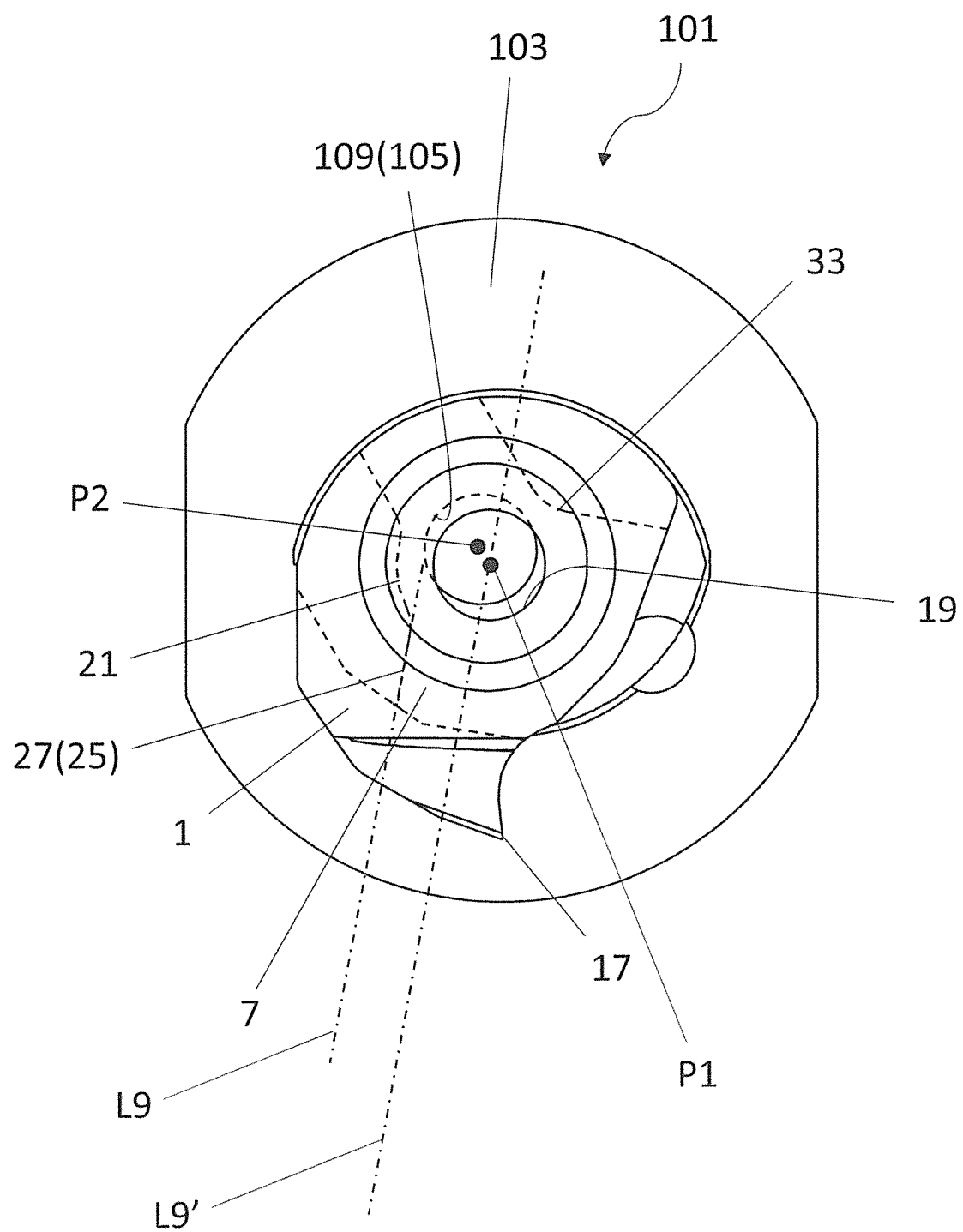
FIG. 22 is a plan view illustrating a state in which a screw is removed in the cutting tool illustrated in FIG. 19.
Figure 23:
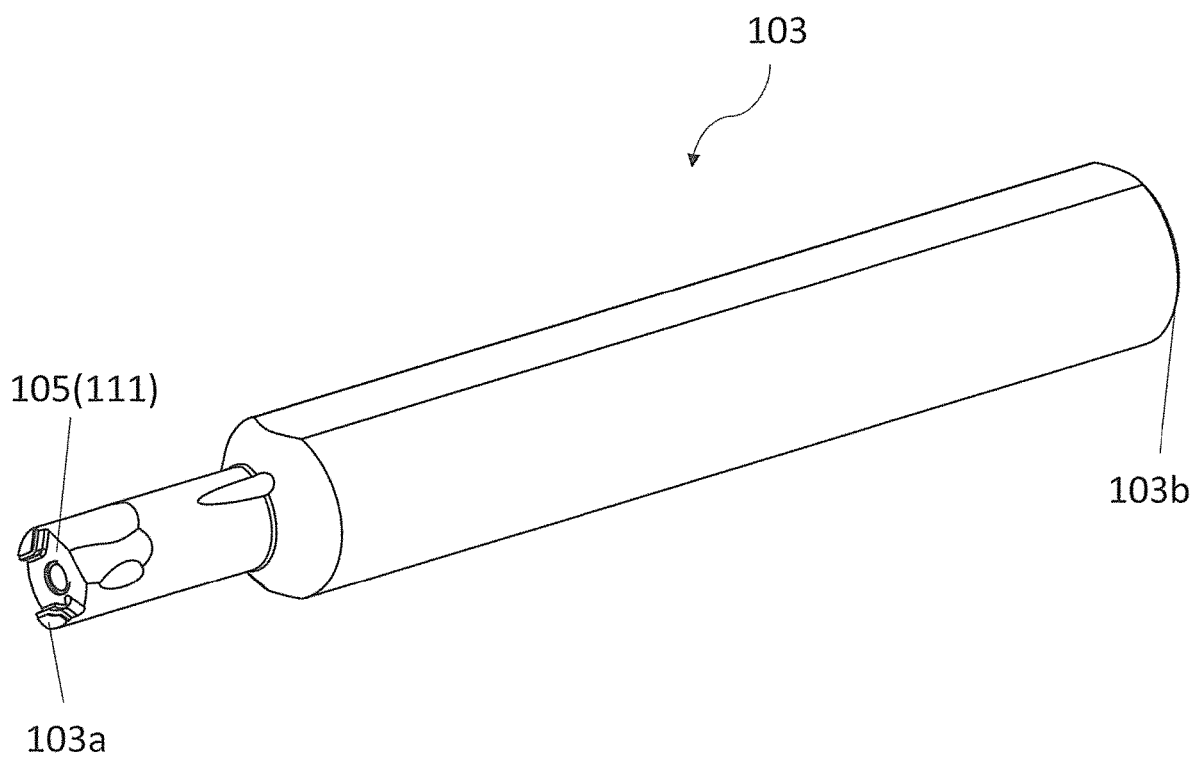
FIG. 23 is a perspective view of a holder in the cutting tool illustrated in FIG. 18.

The cutting tool 101 may include a screw 107 as a fixing tool in the non-limiting embodiment illustrated in FIG. 19 or the like. The pocket 105 may include a screw hole 109 extended from a side of a first end to a side of a second end as illustrated in FIG. 22. The insert 1 is fixable to the holder 103 by inserting the screw 107 into the screw hole 109 in the holder 103 and into the through hole 19 in the insert 1. Specifically, the screw 107 may be inserted into the through hole 19 formed in the insert 1, and a front end of the screw 107 may be inserted into the screw hole 109 formed in the holder 103. The screw 107 may be then engaged with the screw hole 109.

An extending direction of the holder 103 having a bar shape may coincide with an extending direction of the central axis P1 in the insert 1.

Figure 24:
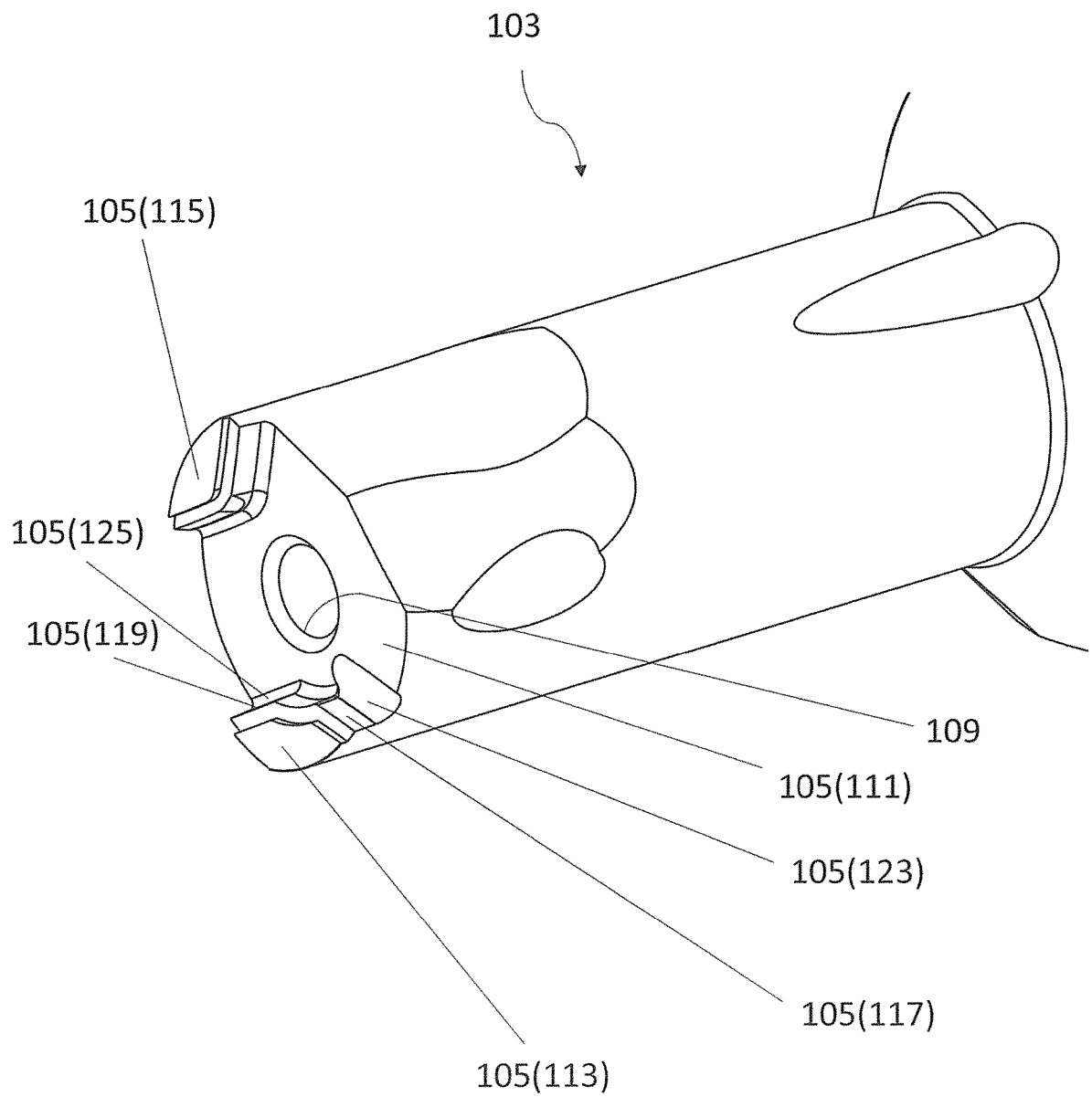
FIG. 24 is an enlarged view of a part on a first end in the holder illustrated in FIG. 23.

The pocket 105 may include a bottom part 111, a first convex part 113 and a second convex part 115 as in the non-limiting embodiment illustrated in FIG. 24. The bottom part 111 may be a part opposed to the first surface. The bottom part 111 may be in contact with the first surface in the insert 1 or, alternatively, may have a flat surface shape. The first convex part 113 may be a part opposed to a first concave part. The second convex part 115 may be a part opposed to a second concave part.

The first convex part 113 and the second convex part 115 may be protruded from the bottom part 111 in a direction from a side of the second end 103b toward a side of the first end 103a. The first convex part 113 may be in contact with the first concave part, and the second convex part 115 may be in contact with the second concave part.

The first convex part 113 may include a ninth surface 117 opposed to the third surface, and a tenth surface 119 opposed to the fourth surface in the non-limiting embodiment illustrated in FIG. 24. The pocket 105 may further include a first portion 123 located between the bottom part 111 and the ninth surface 117, and a second portion 125 located between the bottom part 111 and the tenth surface 119. The first portion 123 may be a curved surface that connects the bottom part 111 and the ninth surface 117. The second portion 125 may be a curved surface that connects the bottom part 111 and the tenth surface 119.

Figure 25:
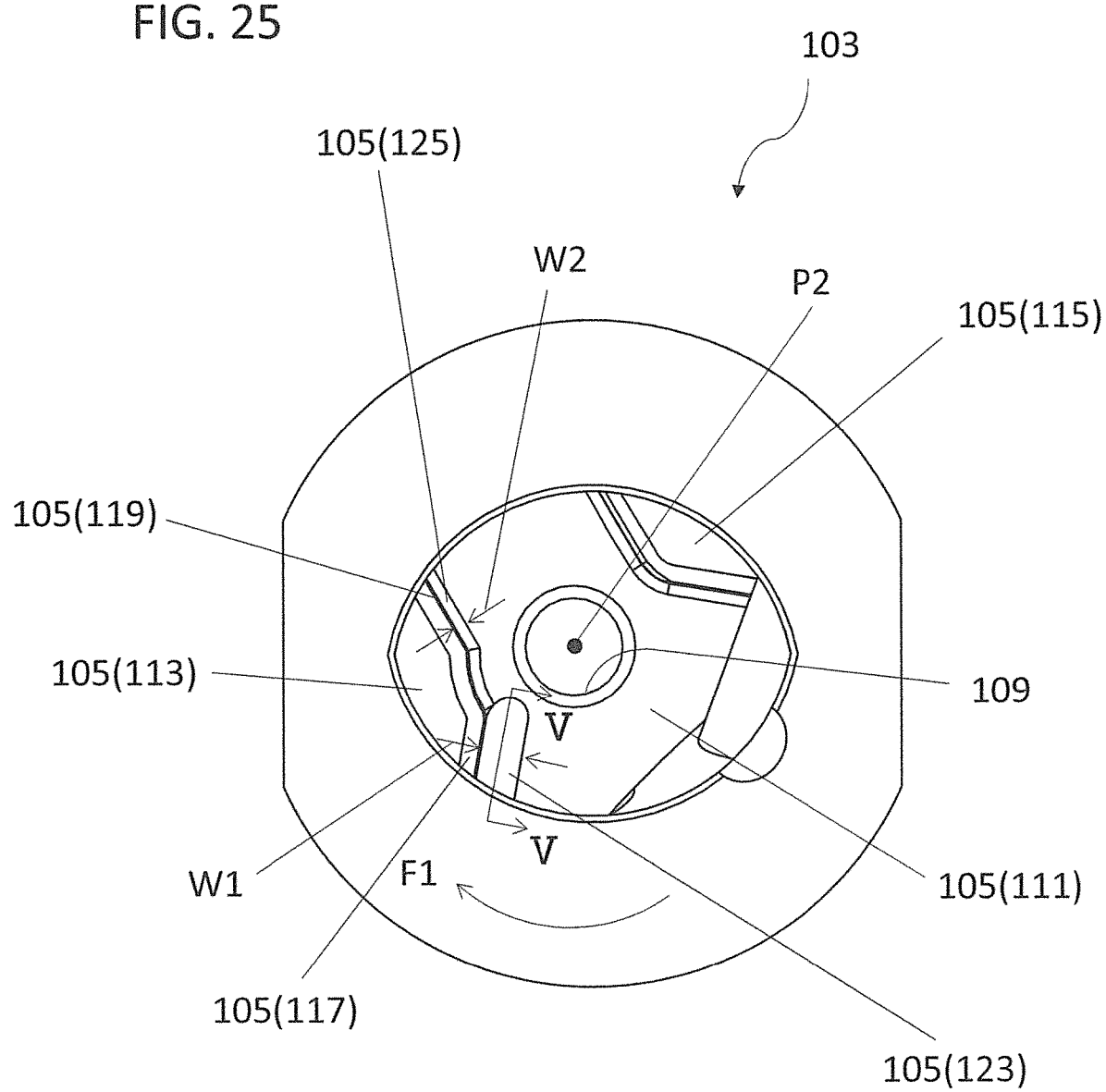
FIG. 25 is a plan view of the holder illustrated in FIG. 23 as viewed toward the first end.

FIGS. 24 and 25 may illustrate a non-limiting embodiment in which the first portion 123 and the second portion 125 have a groove shape. Specifically, a part corresponding to the first portion 123 may be indicated by the first groove part 123, and a part corresponding to the second portion 125 may be indicated by the second groove part 125. A width W1 of the first groove part 123 may be larger than a width W2 of the second groove part 125 in the above configuration.

A principal force may tend to be applied to the first cutting edge in a direction toward a side of a flank surface region in the insert 1 during a cutting process. The insert 1 may be therefore liable to rotate in an F1 direction that is a clockwise direction on the basis of a central axis P2 of the screw hole 109. A force may tend to be applied to the ninth surface 117 opposed to the third surface, and a stress may tend to be concentrated between the bottom part 111 and the ninth surface 117. However, the insert 1 including the above configuration may make it easy to avoid concentration of the stress applied between the bottom part 111 and the ninth surface 117. This may ensure high strength of the holder 103.

The width W1 of the first groove part 123 may be evaluated by a width in a direction orthogonal to the extending direction of the first groove part 123 as illustrated in FIG. 25. FIG. 25 may be a diagram taken when the holder 103 is viewed toward the first end. The width W2 of the second groove part 125 may be evaluated by a width in a direction orthogonal to an extending direction of the second groove part 125 as illustrated in FIG. 25.

The whole of the bottom part 111 may be in contact with the first surface or, alternatively, only a part of the bottom part 111 may be in contact with the first surface. The whole of the first convex part 113 may be in contact with the first concave part or, alternatively, only a part of the first convex part 113 may be in contact with the first concave part. The whole of the second convex part 115 may be in contact with the second concave part or, alternatively, only a part of the second convex part 115 may be in contact with the second concave part. The whole of the ninth surface 117 may be in contact with the third surface or, alternatively, only a part of the ninth surface 117 may be in contact with the third surface. The whole of the tenth surface 119 may be in contact with the fourth surface or, alternatively, only a part of the tenth surface 119 may be in contact with the fourth surface.

Figure 26:
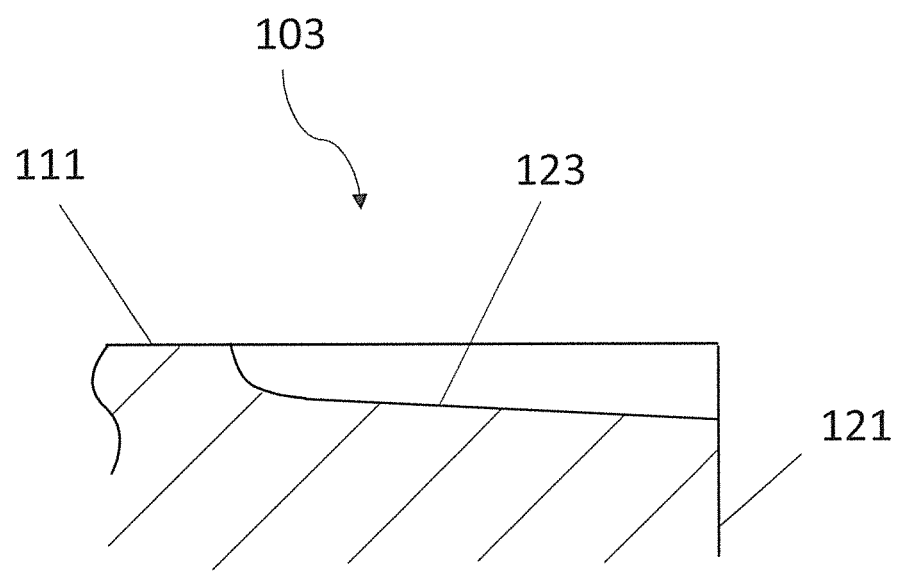
FIG. 26 is a sectional view illustrating a cross section taken along IV-IV in FIG. 25.

The first groove part 123 may include a part that becomes shallower as going away from an outer peripheral surface 121 of the holder 103 as in the non-limiting embodiment illustrated in FIG. 26. Although a stress may be more likely to concentrate at a portion of the first groove part 123 which is closer to the outer peripheral surface 121 of the holder 103, a stress concentration at the portion closer to the outer peripheral surface 121 of the holder 103 can be relaxed if the first groove part 123 includes the above configuration. It may be also possible to ensure a thickness in the vicinity of the screw hole 109 in the holder 103, thus leading to improved strength of the holder 103.

A bottom of the first groove part 123 may have a curvilinear shape or a straight line shape as in the non-limiting embodiment illustrated in FIG. 26.

The pocket 105 may include a screw hole 109 extended from a side of the first end 103a toward a side of the second end 103b in the bottom part 111. The first groove part 123 may be in contact with the screw hole 109, or may be located away from the screw hole 109. The first groove part 123 may be located away from the screw hole 109 in the non-limiting embodiment illustrated in FIG. 25.

If the insert 1 is fixed to the holder 103 by a fixing tool, a load may tend to be applied to a periphery of the screw hole 109 in the holder 103. However, if the first groove part 123 is located away from the screw hole 109, it may be easy to ensure a thickness of the holder 103 in the periphery of the screw hole 109 susceptible to the load. It may be therefore easy to suppress occurrence of cracks in the periphery of the screw hole 109.

The central axis P2 of the screw hole 109 in the holder 103 may coincide with or deviate from the central axis P1 of the through hole 19 in the insert 1. If the central axis P1 coincides with the central axis P2, it may be easy to carry out screwing of the insert 1 into the holder 103.

The central axis P2 may deviate from the central axis P1 in the non-limiting embodiment illustrated in FIG. 22. FIG. 22 may illustrate a positional relationship between the central axis P2 and the central axis P1 in an unscrewed state. The central axis P2 may be indicated by a point in FIG. 22. FIG. 22 may illustrate a cutting tool 101 in a transparent plan view of the holder 103 taken toward the first end.

An imaginary straight line L9 may be set on a ridge line where the first surface 7 intersects with the third surface 27 in the non-limiting embodiment illustrated in FIG. 22. An imaginary straight line that is parallel to the imaginary straight line L9 and passes through the central axis P1 of the through hole 19 may be referred to as an imaginary straight line L9'. The central axis P2 may be located at a side of the first concave part 21 with respect to the imaginary straight line L9'. If the central axis P2 is eccentric from the central axis P1 as described above, the screw 107 may be less likely to come loose after the insert 1 is fixed to the holder 103 by the screw 107.

Alternatively, the central axis P2 may be located farther away from the first cutting edge 17 than the central axis P1 in a direction along the imaginary straight line L9' as illustrated in FIG. 22. Also in this case, the screw 107 may be less likely to come loose after the insert 1 is fixed to the holder 103 by the screw 107.

For example, steel or cast iron may be usable for the holder 103. Of these materials, high tough steel may be particularly suitable.

<Method for Manufacturing Machined Product>

A method for manufacturing a machined product in a non-limiting embodiment of the present disclosure may be described below with reference to the drawings.

The machined product is manufacturable by carrying out a cutting process of a workpiece. The method for manufacturing the machined product in the non-limiting embodiment may include the following steps:

the step (1) of rotating a workpiece 201;

the step (2) of bringing the first cutting edge of the cutting tool 101 represented by the above non-limiting embodiment into contact with the workpiece 201 being rotated; and the step (3) of moving the cutting tool 101 away from the workpiece 201.

Figure 27:
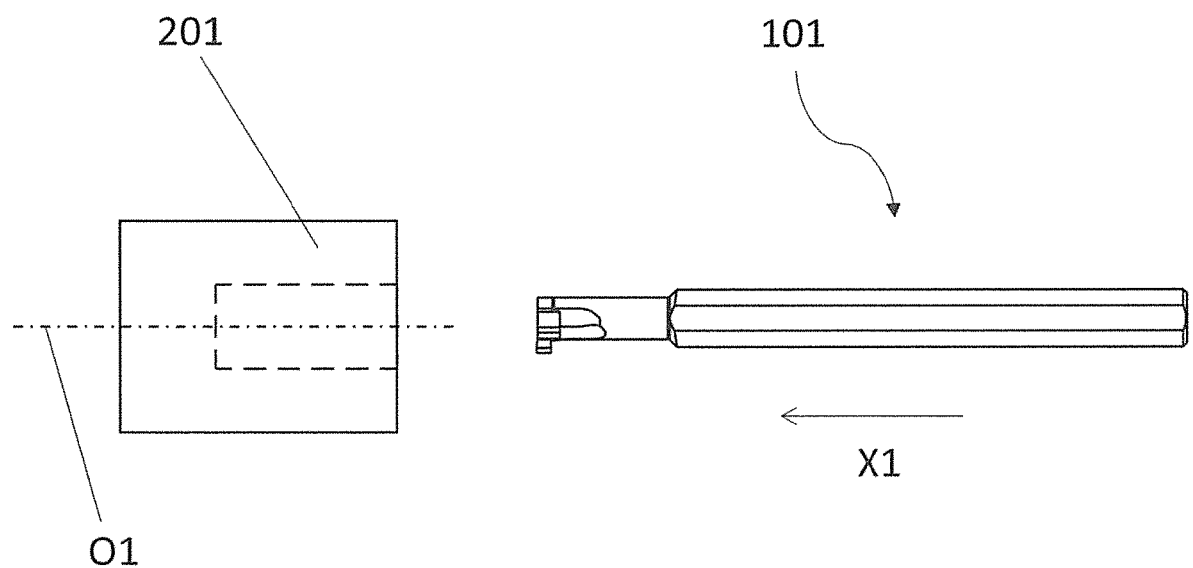
FIG. 27 is a diagram illustrating one of the steps in a method for manufacturing a machined product in a non-limiting embodiment.
Figure 28:
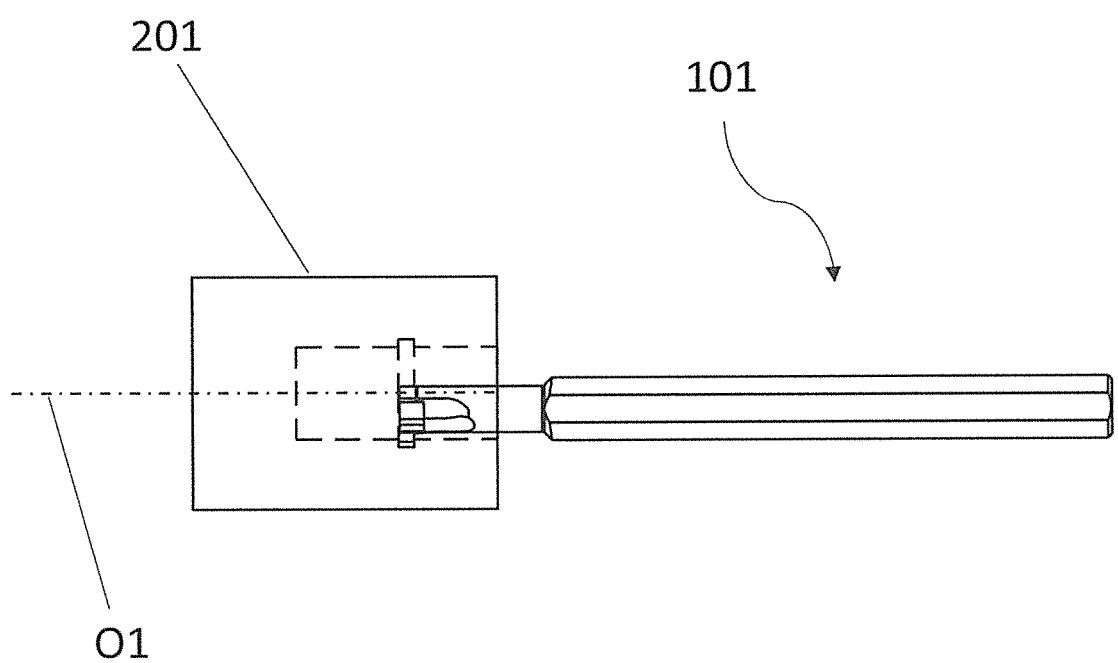
FIG. 28 is a diagram illustrating one of the steps in the method for manufacturing a machined product in a non-limiting embodiment.
Figure 29:
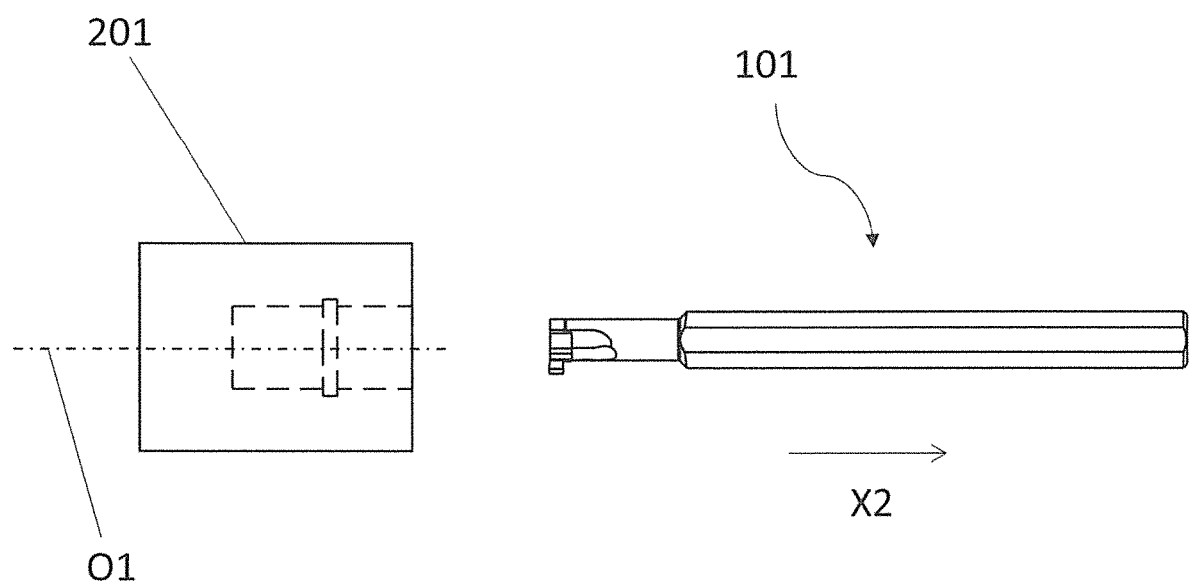
FIG. 29 is a diagram illustrating one of the steps in the method for manufacturing a machined product in a non-limiting embodiment.

More specifically, the workpiece 201 may be firstly rotated around an axis 01 and the cutting tool 101 may be relatively brought near the workpiece 201 as illustrated in FIG. 27. The workpiece 201 may be then cut out by bringing the first cutting edge in the cutting tool 101 into contact with the workpiece 201 being rotated as illustrated in FIG. 28. Thereafter, the cutting tool 101 may be relatively moved away from the workpiece 201 as illustrated in FIG. 29.

In the above non-limiting embodiment, the workpiece 201 may be brought near by moving the cutting tool 101 in an X1 direction in a state in which the axis O is fixed and the workpiece 201 is rotated. In FIG. 28, the workpiece 201 may be cut out by bringing the first cutting edge in the insert into contact with the workpiece 201 being rotated. In FIG. 29, the workpiece 201 may be moved away by moving the cutting tool 101 in an X2 direction in a state in which the workpiece is rotated.

During the cutting process in the manufacturing method of the non-limiting embodiment, the cutting tool 101 may be brought into contact with the workpiece 201, or the cutting tool 101 may be moved away from the workpiece 201 by moving the cutting tool 101 in each of the above steps. However, it is not intended to limit to this non-limiting embodiment.

For example, the workpiece 201 may be brought near the cutting tool 101 in the step (1). Similarly, the workpiece 201 may be moved away from the cutting tool 101 in the step (3). If desired to continue the cutting process, the step of bringing the first cutting edge in the insert into contact with different portions of the workpiece 201 may be repeated while keeping the workpiece 201 rotated.

Examples of material of the workpiece 201 may include carbon steel, alloy steel, stainless steel, cast iron and non-ferrous metals.

Although the non-limiting embodiments in the present disclosure have been illustrated and described above, the present disclosure is not limited to the foregoing non-limiting embodiments. It is, of course, possible to make any optional ones insofar as they do not depart from the gist of the present disclosure.

DESCRIPTION OF THE REFERENCE NUMERALS 1, 1' insert
3 main body
5 cutting part
7 first surface
9 second surface
11 side surface
13 first side surface
13a rake surface region
15 second side surface
15a flank surface region
17 first cutting edge
19 through hole
21 first concave part
23 first bottom surface
25 first wall surface
27 third surface
29 fourth surface
31 fifth surface
33 second concave part
35 second bottom surface
37 second wall surface
39 sixth surface
41 seventh surface
43 eighth surface
45 third side surface
47 fourth side surface
49 protruded part
51 second cutting edge
53 first protruded surface
55 second protruded surface
101 cutting tool
103 holder
103a first end
103b second end
105 pocket
107 screw
109 screw hole
111 bottom part
113 first convex part
115 second convex part
117 ninth surface
119 tenth surface
121 outer peripheral surface
123 first portion (first groove part)
125 second portion (second groove part)
201 workpiece
P1 central axis of through hole
P2 central axis of screw hole
L1 imaginary straight line
L2 vertical line
L3 imaginary extension line
L4 imaginary straight line
L5 imaginary extension line
L6 bisector
L7 imaginary extension line
L8 imaginary straight line
L9 imaginary straight line
L9' imaginary straight line

The invention claimed is:

1. An insert, comprising:
a main body comprising:
 a first surface;
 a second surface located on an opposite side of the first surface;
 a side surface located between the first surface and the second surface,
 the side surface comprising:
  a first side surface comprising a rake surface region,
  a second side surface comprising a flank surface region, the second side surface connected to the first side surface, and
  a ridge line located at an intersection of the first side surface and the second side surface;
 a first cutting edge located on at least a part of the ridge line;
 a through hole opening into the first surface and the second surface;
 a first concave part extending from the first surface to the side surface; and
 a second concave part extending from the first surface to the side surface;
wherein,
 the first concave part is located at a side of the second side surface with respect to an imaginary straight line connecting the first cutting edge and a center of the through hole in a front view of the first surface, and
 the second concave part is located at an opposite side of the second side surface with respect to the imaginary straight line and is located farther away from the first cutting edge than the center of the through hole in the front view of the first surface.

2. The insert according to claim 1, wherein
the first concave part is located away from the through hole.

3. The insert according to claim 1, wherein,
the first concave part comprises a first bottom surface and
 a first wall surface located between the first bottom surface and the first surface,
a straight line that passes through the center of the through hole and is orthogonal to the imaginary straight line is a vertical line in the front view of the first surface, and
the first wall surface intersects the vertical line in the front view of the first surface.

4. The insert according to claim 3, wherein
the first wall surface comprises:
 a third surface,
 a fourth surface, and
 a fifth surface located between the third surface and the fourth surface, the fifth surface intersecting the vertical line and protruding toward a side of an outer periphery of the main body in the front view of the first surface.

5. The insert according to claim 1, wherein,
the second concave part comprises a second bottom surface and a second wall surface located between the second bottom surface and the first surface, and
the second wall surface comprises, as two surfaces, a sixth surface and a seventh surface.

6. The insert according to claim 5, wherein,
the first concave part comprises a first bottom surface and a first wall surface located between the first bottom surface and the first surface;
a straight line that passes through the center of the through hole and is orthogonal to the imaginary straight line is a vertical line in the front view of the first surface;
the first wall surface comprises:
  a third surface,
  a fourth surface located farther away from the first cutting edge than the third surface, and
  a fifth surface located between the third surface and the fourth surface, the fifth surface intersecting the vertical line in the front view of the first surface;
  the sixth surface is located farther away from the first cutting edge than the seventh surface; and
a ridge line where the first surface intersects with the fourth surface and a ridge line where the first surface intersects with the sixth surface, both ridge lines are in parallel to each other in the front view of the first surface.

7. The insert according to claim 6, wherein,
in the front view of the first surface, a bisector of an angle, formed by an imaginary extension line of a ridge line where the first surface intersects with the third surface, and an imaginary extension line of a ridge line where the first surface intersects with the seventh surface, is parallel to each of a ridge line where the first surface intersects with the fourth surface and a ridge line where the first surface intersects with the sixth surface.

8. The insert according to claim 5, wherein,
an imaginary straight line that intersects with the first surface and is parallel to a central axis of the through hole is an imaginary axis, and
the sixth surface is inclined so as to approach the imaginary axis going from a side of the second bottom surface toward a side of the first surface in a cross section orthogonal to the first surface and the sixth surface.

9. A cutting tool, comprising:
a holder which has a bar shape extended from a first end to a second end and comprises a pocket located at a side of the first end; and
the insert according to claim 1, the insert being located in the pocket.

10. The cutting tool according to claim 9, wherein,
the pocket comprises a screw hole extended from a side of the first end toward a side of the second end;
a central axis of the through hole is parallel to a central axis of the screw hole;
the first concave part comprises a first bottom surface and a first wall surface located between the first bottom surface and the first surface;
a straight line that passes through the center of the through hole and is orthogonal to the imaginary straight line is a vertical line in the front view of the first surface;
the first wall surface comprises:
  a third surface,
  a fourth surface, and
  a fifth surface located between the third surface and the fourth surface, the fifth surface intersecting the vertical line in the front view of the first surface; and
in a perspective view of the holder taken toward the first end, the central axis of the screw hole is located at a side of the first concave part with respect to an imaginary straight line which is parallel to a ridge line where the first surface intersects with the third surface and which passes through the central axis of the through hole.

11. The cutting tool according to claim 10, wherein
in the perspective view of the holder taken toward the first end, the central axis of the screw hole is located farther away from the first cutting edge than the central axis of the through hole in a direction along the ridge line where the first surface intersects with the third surface.

12. The cutting tool according to claim 9, wherein,
the first concave part comprises a first bottom surface and a first wall surface located between the first bottom surface and the first surface;
a straight line that passes through the center of the through hole and is orthogonal to the imaginary straight line is a vertical line in the front view of the first surface;
the first wall surface comprises:
  a third surface,
  a fourth surface, and
  a fifth surface located between the third surface and the fourth surface, the fifth surface intersecting the vertical line in the front view of the first surface;
the pocket comprises a bottom part opposed to the first surface, and a first convex part opposed to the first concave part;
the first convex part comprises a ninth surface opposed to the third surface, and a tenth surface opposed to the fourth surface;
the pocket further comprises a first groove part which is located between the bottom part and the ninth surface and opens into an outer peripheral surface of the holder, and a second groove part which is located between the bottom part and the tenth surface and opens into the outer peripheral surface of the holder;
the ninth surface is closer to the first cutting edge than the tenth surface; and
a width of the first groove part is larger than a width of the second groove part.

13. A method for manufacturing a machined product, comprising:
rotating a workpiece;
bringing the cutting tool according to claim 9 into contact with a workpiece being rotated; and
moving the cutting tool from the workpiece.

14. An insert, comprising:
a main body comprising:
  a first surface;
  a second surface located on an opposite side of the first surface;
  a side surface located between the first surface and the second surface, the side surface comprising:
    a first side surface,
    a second side surface connected to the first side surface, and
    a ridge line located at an intersection of the first side surface and the second side surface;
  a first cutting edge located on at least a part of the ridge line;

a through hole opening into the first surface and the second surface; and a first concave part extended from the first surface to the side surface;

wherein, the first concave part is located away from an imaginary straight line connecting the first cutting edge and a center of the through hole in a front view of the first surface;

the first concave part comprises a first bottom surface and a first wall surface located between the first bottom surface and the first surface;

a straight line that passes through the center of the through hole and is orthogonal to the imaginary straight line is a vertical line in the front view of the first surface;

the first wall surface intersects the vertical line in the front view of the first surface; and the first wall surface comprises:
- a third surface;
- a fourth surface; and
- a fifth surface located between the third surface and the fourth surface, the fifth surface intersecting the vertical line and protruding toward a side of an outer periphery of the main body in the front view of the first surface.

15. A cutting tool, comprising:

a holder which has a bar shape extended from a first end to a second end and comprises a pocket located at a side of the first end; and the insert according to claim 14, the insert being located in the pocket.

16. The cutting tool according to claim 15, wherein the first groove part comprises a portion that becomes shallower going away from the outer peripheral surface.

17. The cutting tool according to claim 16, wherein, the pocket comprises a screw hole extended from a side of the first end toward a side of the second end, and the first groove part is located away from the screw hole.

18. A cutting tool, comprising:

a holder which has a bar shape extended from a first end to a second end and comprises a pocket located at a side of the first end; and an insert located in the pocket;

wherein, the insert comprises:
- a main body comprising:
  - a first surface;
  - a second surface located on an opposite side of the first surface;
  - a side surface located between the first surface and the second surface, the side surface comprising:
    - a first side surface,
    - a second side surface connected to the first side surface, and
    - a ridge line located at an intersection of the first side surface and the second side surface;
  - a first cutting edge located on at least a part of the ridge line;
  - a through hole opening into the first surface and the second surface; and
  - a first concave part extended from the first surface to the side surface;

the first concave part is located away from an imaginary straight line connecting the first cutting edge and a center of the through hole in a front view of the first surface;

the first concave part comprises a first bottom surface and a first wall surface located between the first bottom surface and the first surface;

a straight line that passes through the center of the through hole and is orthogonal to the imaginary straight line is a vertical line in the front view of the first surface;

the first wall surface comprises:
- a third surface,
- a fourth surface, and
- a fifth surface located between the third surface and the fourth surface, the fifth surface intersecting the vertical line in the front view of the first surface;

the pocket comprises a bottom part opposed to the first surface, and a first convex part opposed to the first concave part;

the first convex part comprises a ninth surface opposed to the third surface, and a tenth surface opposed to the fourth surface;

the pocket further comprises a first groove part which is located between the bottom part and the ninth surface and opens into an outer peripheral surface of the holder, and a second groove part which is located between the bottom part and the tenth surface and opens into the outer peripheral surface of the holder;

the ninth surface is closer to the first cutting edge than the tenth surface; and a width of the first groove part is larger than a width of the second groove part.

* * * * *